United States Patent [19]

Lahr

[11] Patent Number: 4,661,005

[45] Date of Patent: Apr. 28, 1987

[54] SPITTABLE KEYBOARD FOR WORD PROCESSING, TYPING AND OTHER INFORMATION INPUT SYSTEMS

[75] Inventor: Roy J. Lahr, Los Angeles, Calif.

[73] Assignee: Creative Associates, Los Angeles, Calif.

[21] Appl. No.: 570,747

[22] Filed: Jan. 16, 1984

[51] Int. Cl.⁴ .............................................. B41J 5/10
[52] U.S. Cl. .................................... 400/489; 400/82; 400/472; 400/479; 400/491.3; 400/680; 400/682; 400/704; 400/718; 340/365 R; 340/407; D18/1
[58] Field of Search ................... 400/82, 88, 472, 473, 400/479, 477, 485, 486, 488, 489, 491.3, 494, 691, 692, 693, 718, 718.1, 718.2, 680, 682, 703, 704, 715; 312/208, 294, 308; 340/365 R, 711, 712, 365 C, 407; D14/40, 100, 102, 103, 104, 106, 114, 115; D18/1, 2, 7; 200/DIG. 1, DIG. 2; 323/904; 324/61 R, 61 P; 434/227, 228, 229, 231, 233

[56] References Cited

U.S. PATENT DOCUMENTS

| | | | |
|---|---|---|---|
| D. 203,140 | 12/1965 | Cuccio | D18/2 |
| D. 266,672 | 10/1982 | Landin | D14/114 |
| D. 275,955 | 10/1984 | Moraine | D14/106 |
| D. 276,232 | 11/1984 | Dix et al. | D14/106 |
| 317,371 | 5/1885 | Kaley | 400/144.2 |
| 1,138,474 | 5/1915 | Heidner | 400/489 |
| 1,151,730 | 8/1915 | Smith | 400/82 |
| 1,151,839 | 8/1915 | Ursbruck | 400/82 |
| 1,206,072 | 11/1916 | Yanagiwara | 400/82 |
| 1,336,151 | 4/1920 | O'Connor | 400/489 |
| 1,366,137 | 1/1921 | Stuart | 400/486 |
| 1,506,426 | 8/1924 | Hoke | 400/486 |
| 1,576,858 | 3/1926 | Sholes | 400/82 |
| 1,652,464 | 12/1927 | Tyberg | 400/489 |

(List continued on next page.)

FOREIGN PATENT DOCUMENTS

| | | | |
|---|---|---|---|
| 1026723 | 2/1978 | Canada | 340/365 R |
| 1106895 | 8/1981 | Canada | 312/208 |
| 61595 | 10/1982 | European Pat. Off. | 340/365 R |
| 1080126 | 10/1960 | Fed. Rep. of Germany | 400/489 |
| 1279693 | 10/1968 | Fed. Rep. of Germany | 400/489 |
| 2607126 | 8/1977 | Fed. Rep. of Germany | 400/489 |
| 2737854 | 3/1979 | Fed. Rep. of Germany | 340/365 R |
| 320203 | 8/1902 | France | 434/227 |
| 56-111937 | 9/1981 | Japan | 340/365 R |
| 57-8830 | 1/1982 | Japan | 340/365 R |
| 58-193176 | 11/1983 | Japan | 400/488 |
| 83/03797 | 11/1983 | World Int. Prop. O. | 400/718 |

OTHER PUBLICATIONS

"Input Keyboard", P. E. Stuckert, *IBM Tech. Disc. Bull.*; vol. 14, No. 3, pp. 952-959; Aug. 1971.

"Pushbutton Switch w/no Moving Parts"; R. A. Johnson; *IBM Tech. Disc. Bull.*; vol. 13, No. 11, p. 3551; Apr. 1971.

Primary Examiner—Edgar S. Burr
Assistant Examiner—David A. Wiecking
Attorney, Agent, or Firm—Kenyon & Kenyon

[57] ABSTRACT

A keyboard arrangement for reducing stress and tension experienced by a human operator during communication with an information processing machine. The keyboard, which may have the actuators thereon arranged in a conventional keyboard distribution, such as a QWERTY keyboard system, is splitable into first and second sections, each such section containing respective portions of the actuators. When joined, the two keyboard sections form a unitary keyboard which is conventional in appearance and operation. When separated, a display screen may be interposed between the keyboard sections, and the keyboard sections may be arranged in selectable spatial positions and orientations selected for the comfort of the operator. An adjustable mechanical mounting arrangement is provided for ensuring positional stability of the keyboard sections. In a further embodiment, an information processing system is arranged to be portable in a housing which permits the screen to assume a sloped position. When not in use, the keyboard sections may be stored in a compartment beneath the display screen.

44 Claims, 28 Drawing Figures

U.S. PATENT DOCUMENTS

| | | | |
|---|---|---|---|
| 2,040,248 | 5/1936 | Dvorak et al. | 400/486 |
| 2,196,987 | 4/1940 | Gaston | 400/82 |
| 2,666,515 | 1/1954 | Brumhill et al. | 400/82 |
| 2,762,485 | 9/1956 | Bafour et al. | 400/82 |
| 3,020,995 | 2/1962 | Holt | 434/227 |
| 3,305,062 | 2/1967 | Kittredge | |
| 3,334,237 | 8/1967 | Dodsworth et al. | 400/472 |
| 3,507,376 | 4/1970 | Kafafian | 340/365 R |
| 3,698,532 | 10/1972 | Dodds | 400/472 |
| 3,825,101 | 7/1974 | Wineman | D18/1 |
| 3,830,352 | 8/1974 | Kolpek | D18/1 |
| 3,929,216 | 12/1975 | Einbinder | 400/489 |
| 3,940,758 | 2/1976 | Margolin | 400/88 |
| 3,945,482 | 3/1976 | Einbinder | 400/489 |
| 3,990,565 | 11/1976 | Felton et al. | 400/473 |
| 4,081,068 | 3/1978 | Zapp | 400/489 |
| 4,180,336 | 12/1979 | Lonsdale | 400/494 |
| 4,193,119 | 3/1980 | Arase et al. | 364/900 |
| 4,197,026 | 4/1980 | Vorbach et al. | 400/718 |
| 4,244,659 | 1/1981 | Malt | 400/486 |
| 4,294,496 | 10/1981 | Murez | 312/208 |
| 4,310,254 | 1/1982 | D'Angiolillo et al. | 400/109 |
| 4,316,082 | 2/1982 | Fritz | 312/208 |
| 4,330,776 | 5/1982 | Dennison et al. | 400/83 |
| 4,365,779 | 12/1982 | Bates et al. | 248/371 |
| 4,371,276 | 2/1983 | Mitrovich et al. | 400/629 |
| 4,378,553 | 3/1983 | McCall | 400/82 |
| 4,458,961 | 7/1984 | Browning | 312/208 |
| 4,483,572 | 11/1984 | Story | 312/208 |
| 4,490,604 | 12/1984 | Read et al. | 312/208 |
| 4,493,573 | 1/1985 | Hashimoto et al. | 400/692 |
| 4,509,873 | 4/1985 | Ryan | 400/489 |

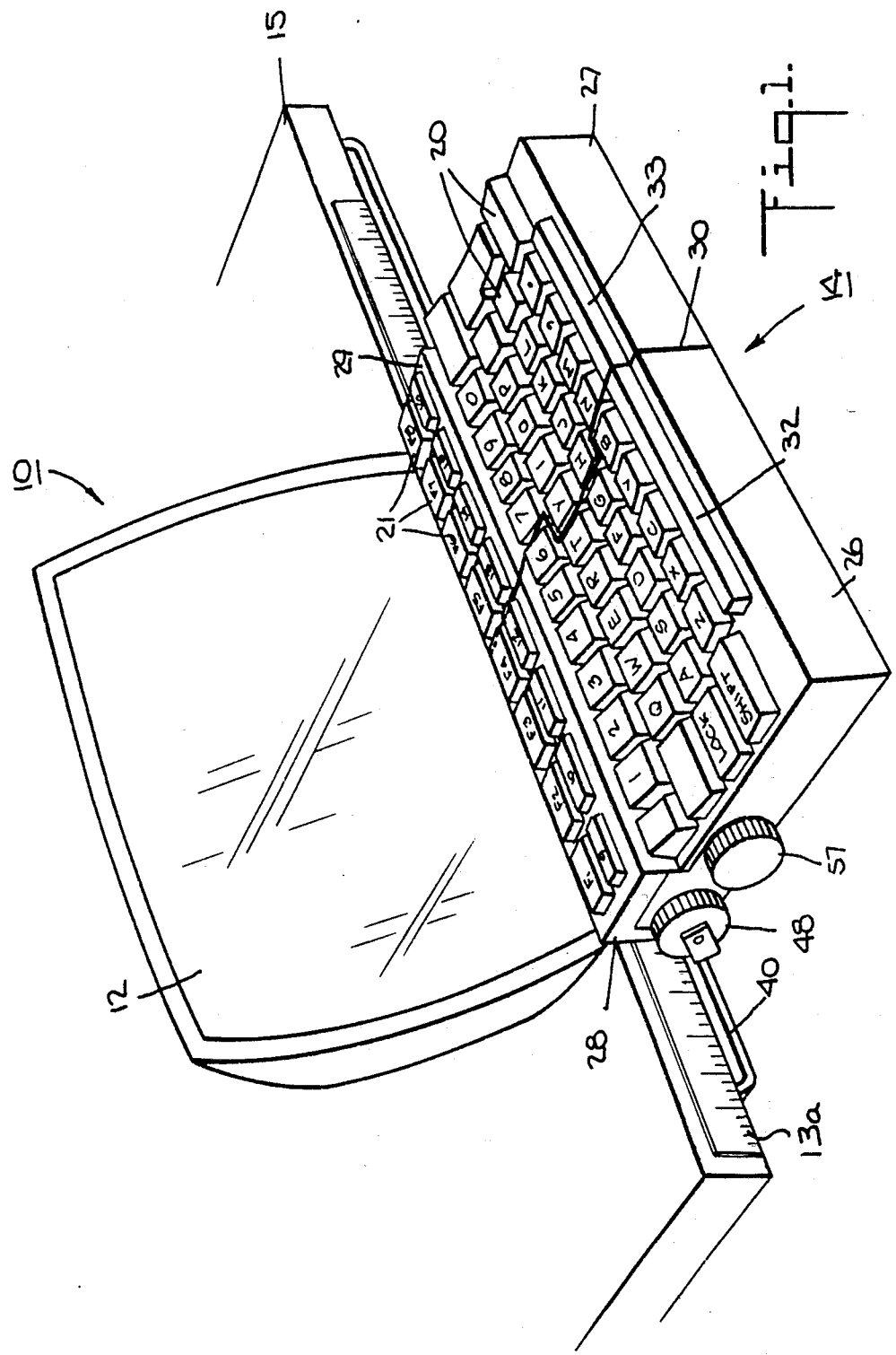

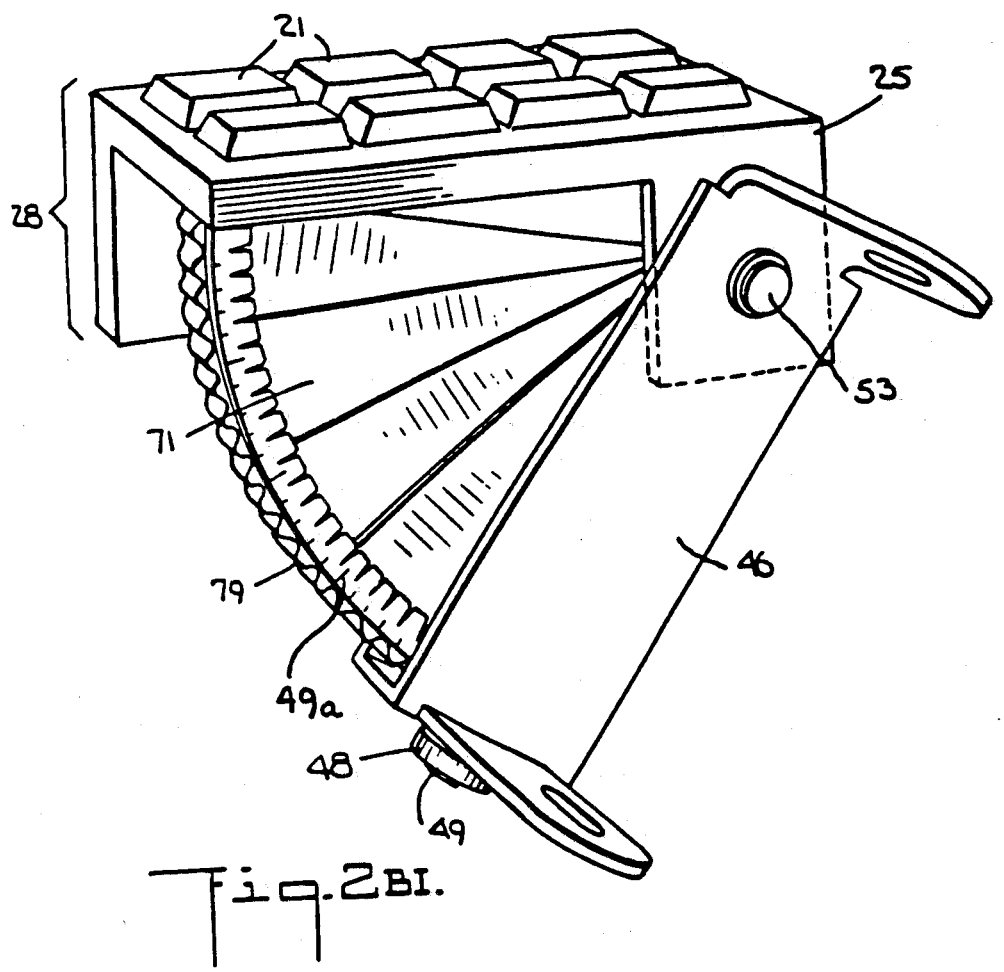
Fig.2B1.

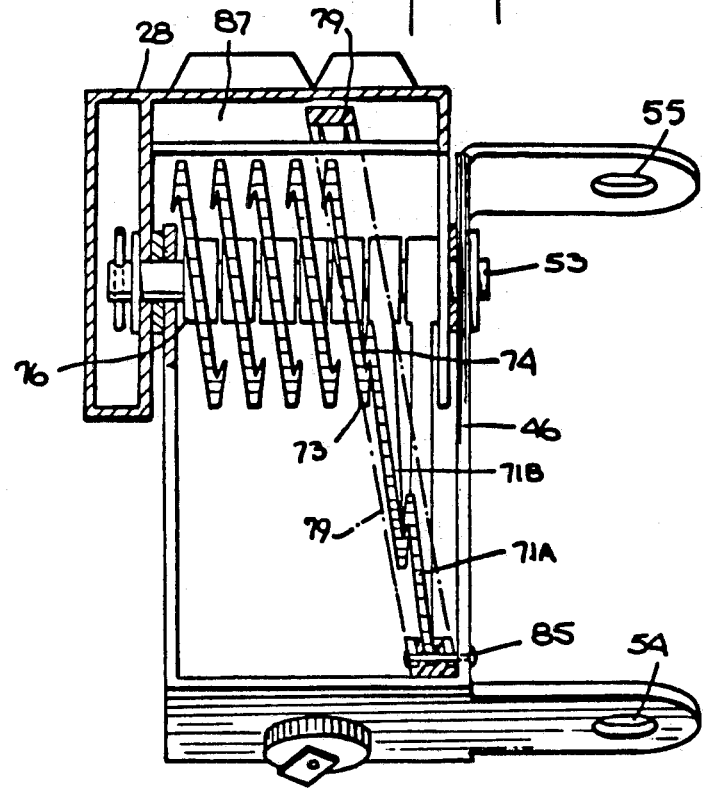

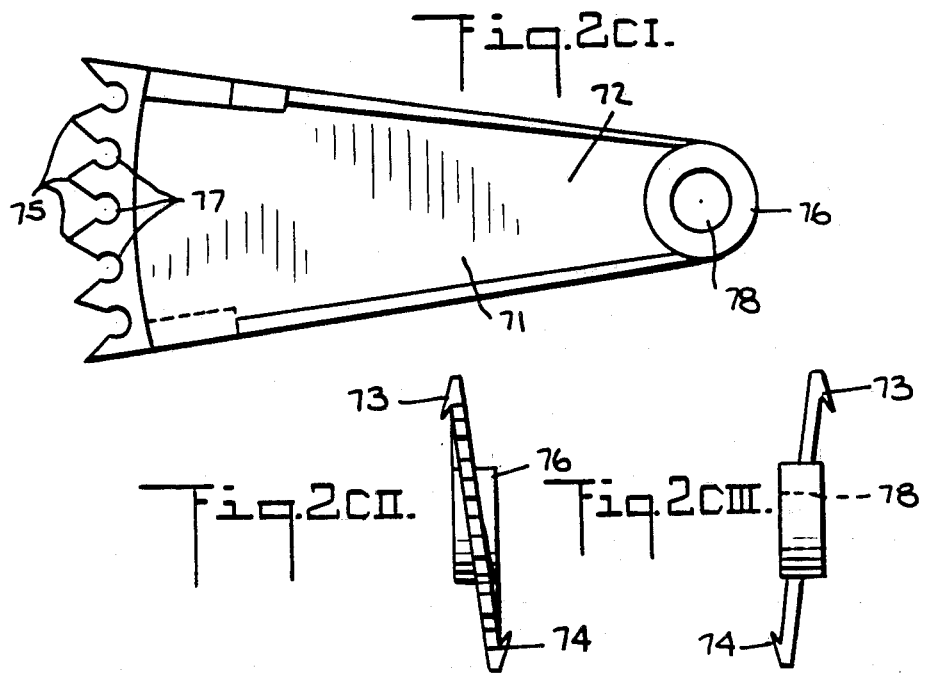
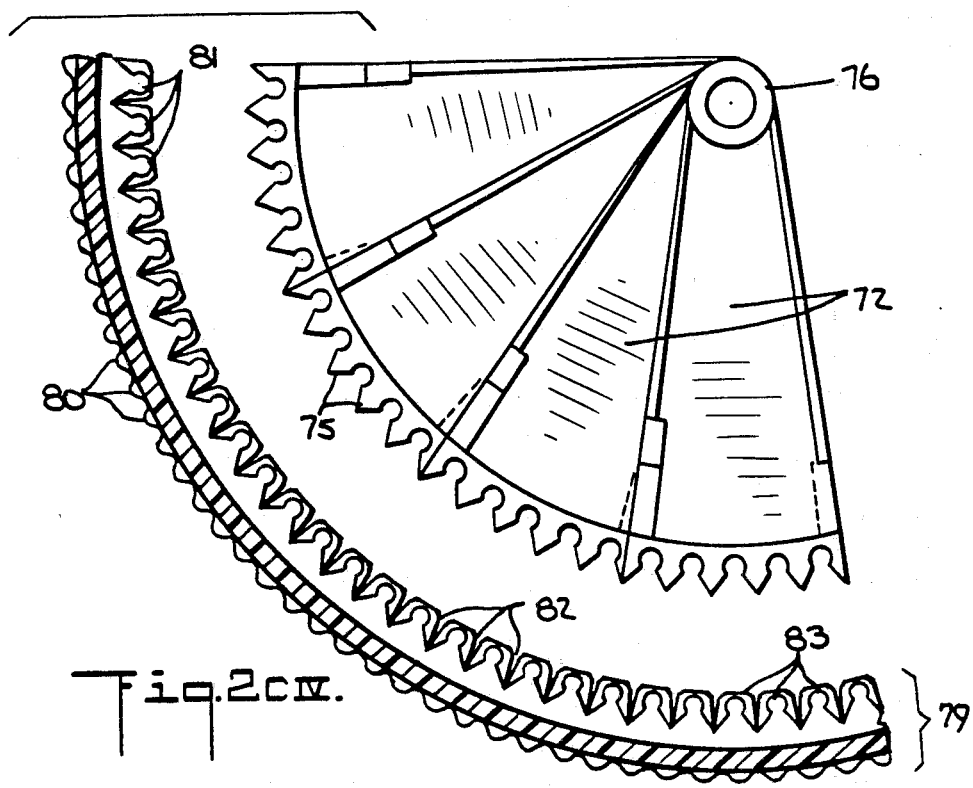

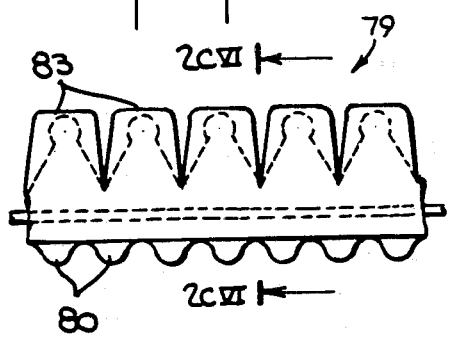
Fig.2CV.
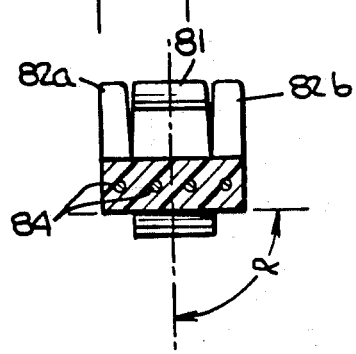
Fig.2CVI.
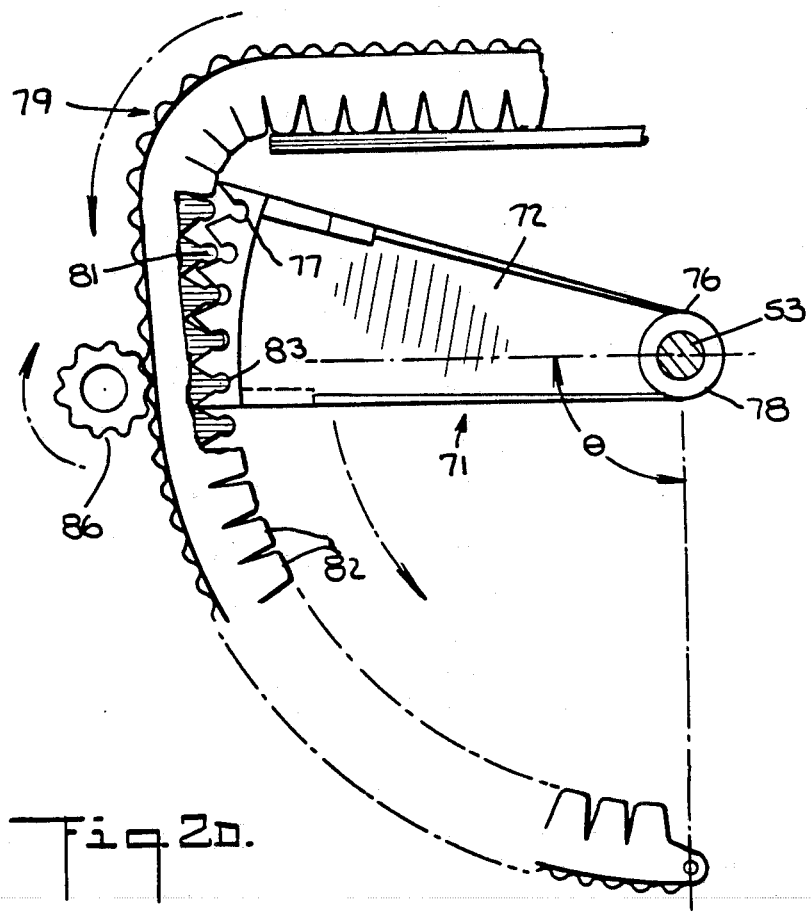
Fig.2D.

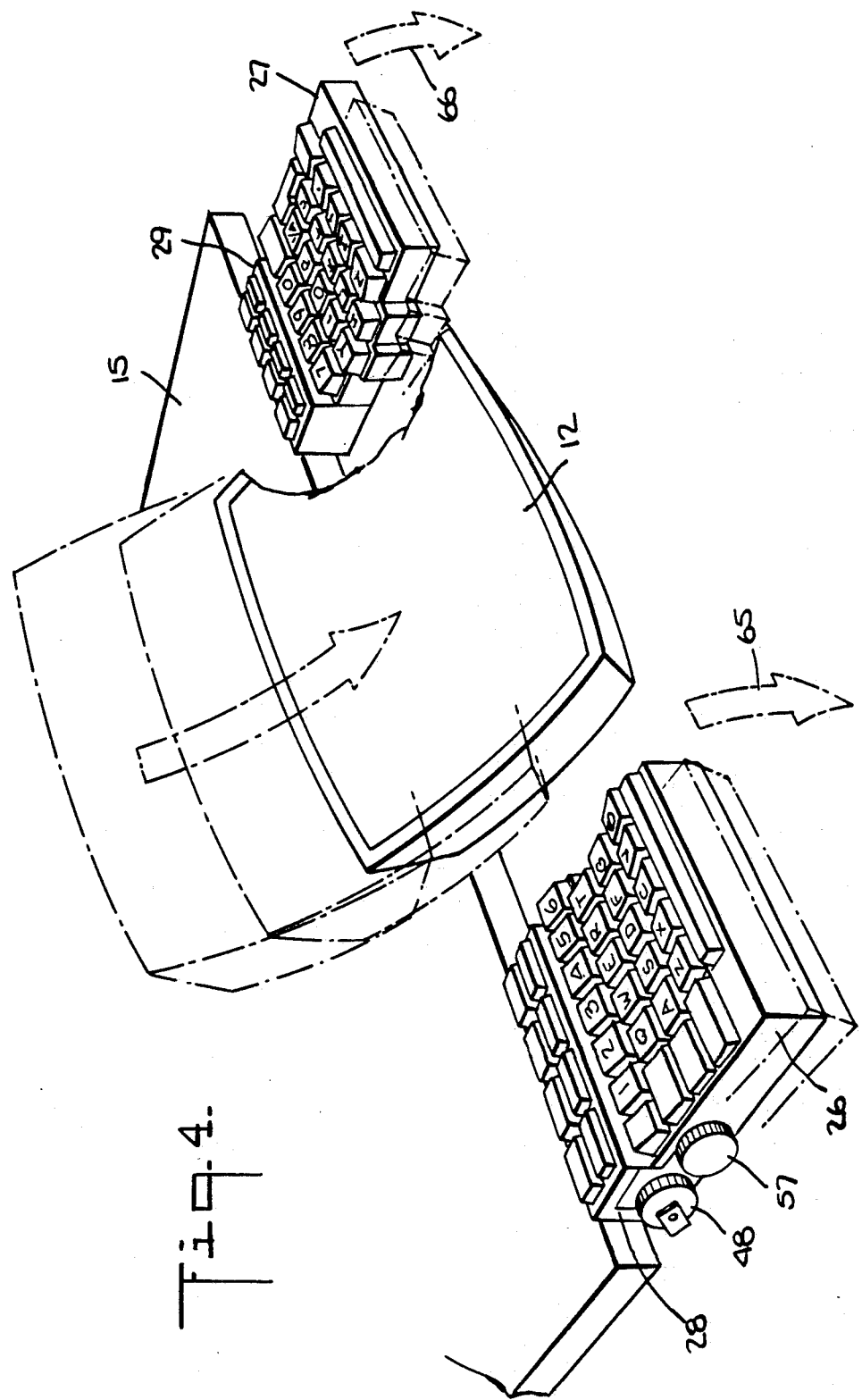

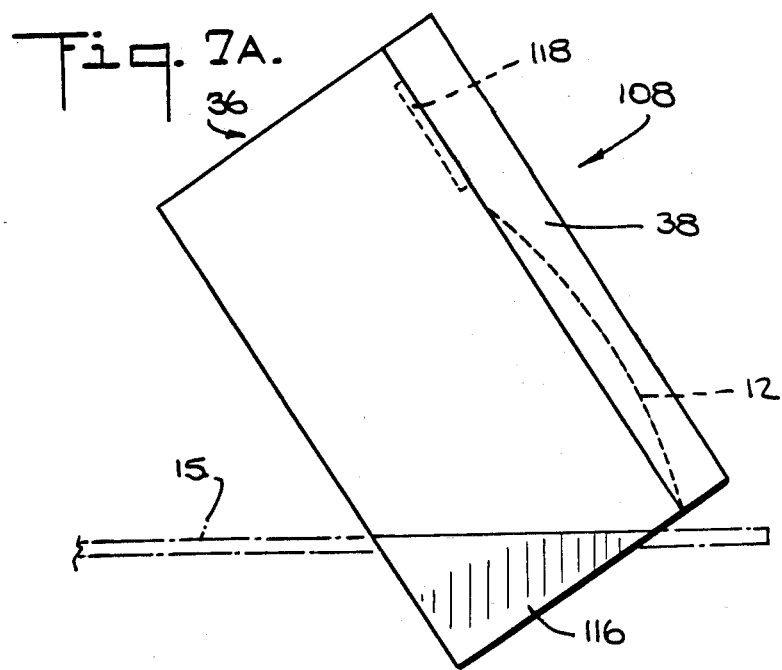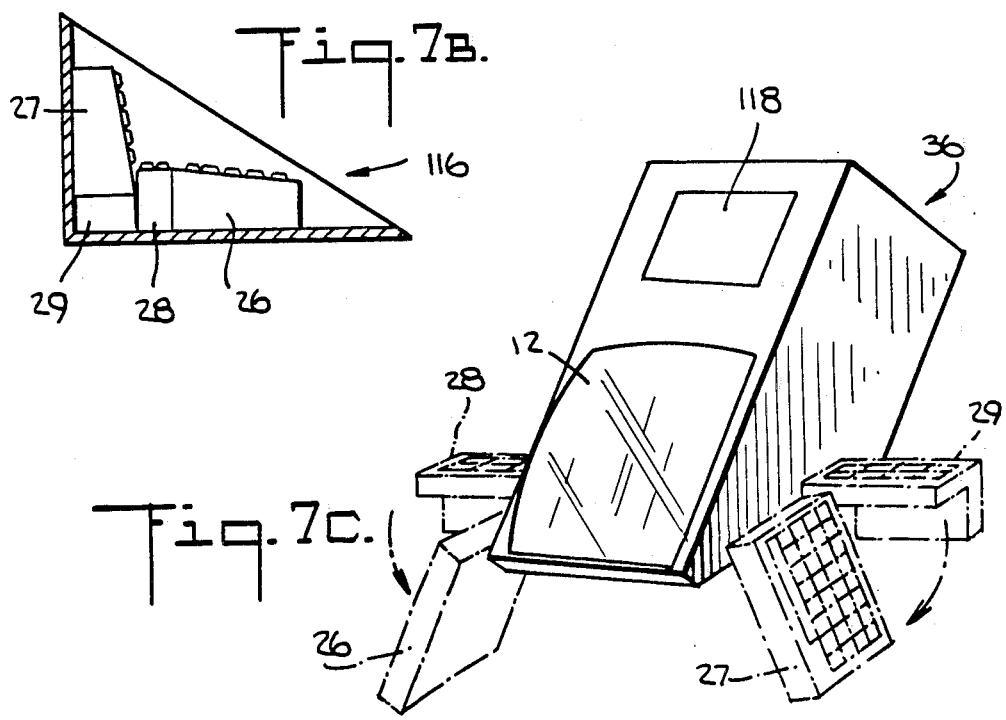

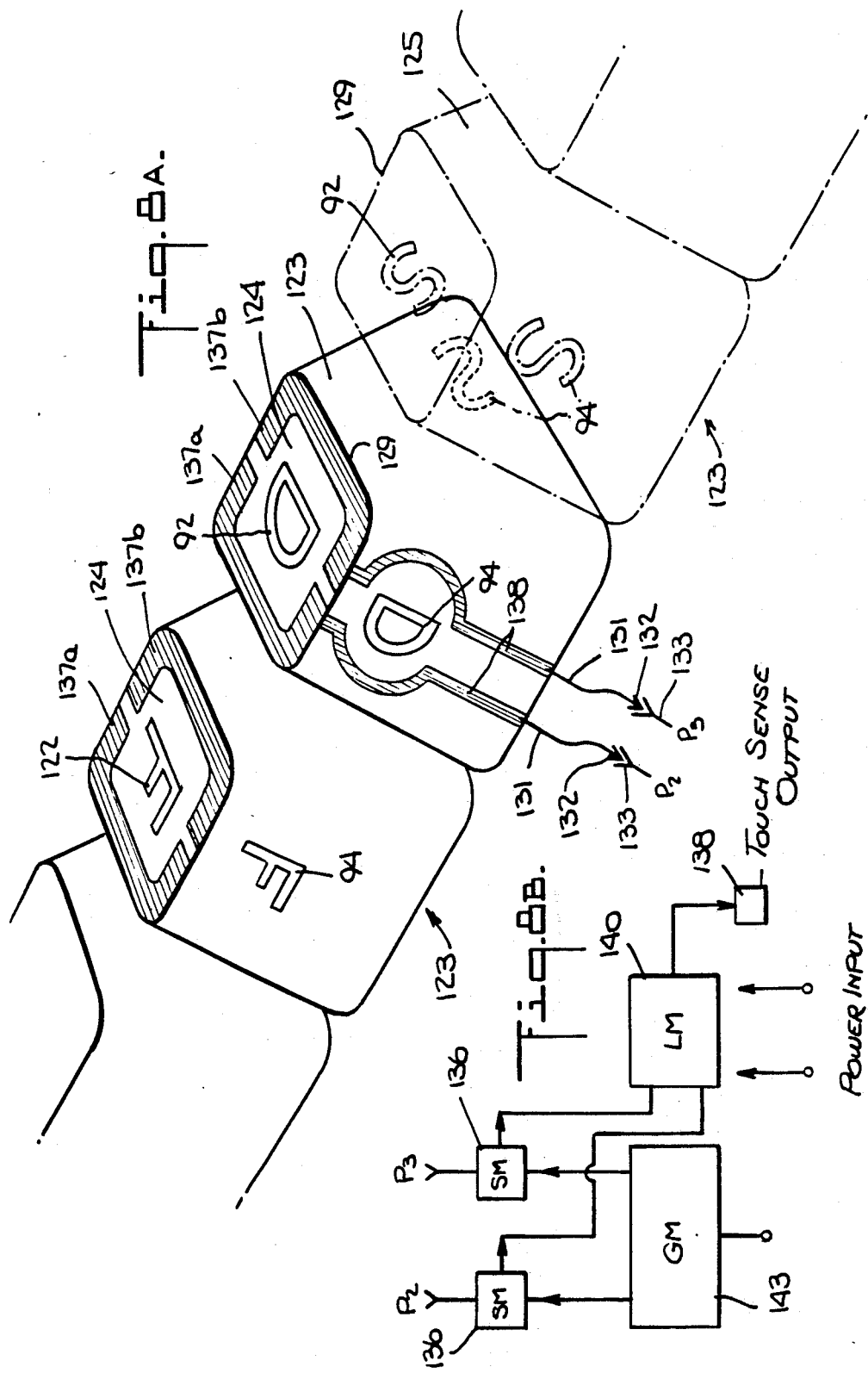

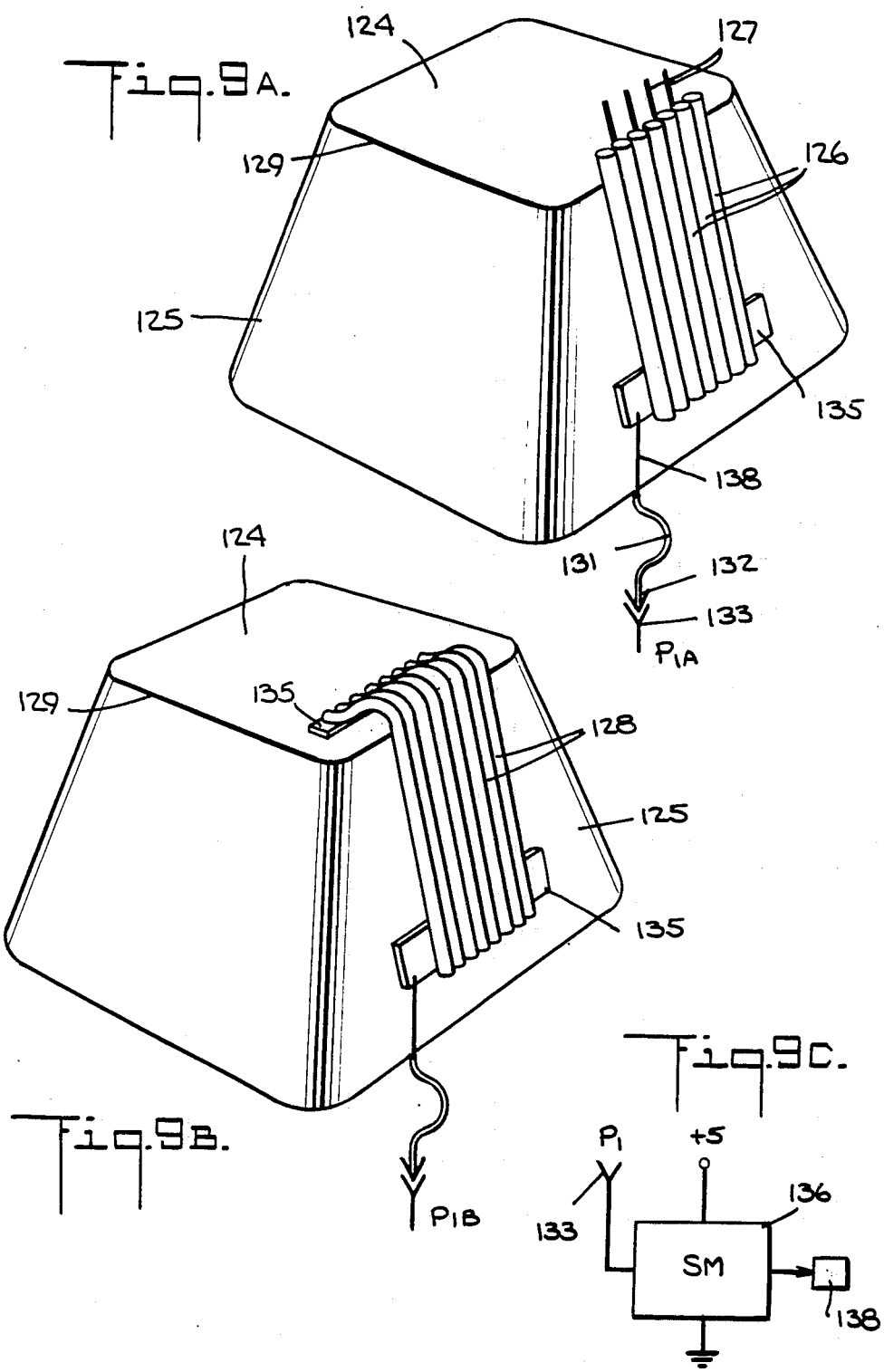

SPITTABLE KEYBOARD FOR WORD PROCESSING, TYPING AND OTHER INFORMATION INPUT SYSTEMS

RELATIONSHIP TO OTHER APPLICATIONS

This disclosure is related to, and incorporates by reference, the following applications, filed concurrently herewith on Jan. 16, 1984.

Rotary Printer With Off-Carriage Motor Drive, Ser. No. 570,737, abandoned and refiled as 802,620 on 11/27/85 and now abandoned.

Shift System for Multi-Row Print Element Ser. No. 570,739.

System for Using Multiple Print Heads in Single Printer, Ser. No. 570,732, abandoned; (IP Ser. No. 855,813 filed on 4/24/86.

Paper Transport System for Printer, Ser. No. 570,738, abandoned and refiled as Ser. No. 778,293 on 9/20/85, abandoned and refiled on 7/1/86 as Ser. No. 883,849.

Changer Arrangement for Information-Bearing Elements, Ser. No. 570,745.

Printer Supplies Monitoring System, Ser. No. 570,744, abandoned and refiled as Ser. No. 794,951 on 11/1/85, now abandoned.

Ribbon Indicia System, Ser. No. 570,734, abandoned and refiled as Ser. No. 797,180 on 11/8/85.

Vacuum Buffered Ribbon Transport System, Ser. No. 570,913, abandoned and refiled as Ser. No. 794,691 on 11/4/85, now abandoned.

High Capacity Ribbon Supply Arrangement, Ser. No. 570,746, abandoned and refiled as Ser. No. 797,748 on 11/12/85, now U.S. Pat. No. 4,657,418 issued 4/14/87.

Rotary Print Element, Components thereof and Coupling Apparatus therefor, Ser. No. 570,733, abandoned and refiled as Ser. No. 777,564 on 9/18/85, abandoned and refiled as Ser. No. 884,873 on 7/9/86.

BACKGROUND OF THE INVENTION

This invention relates generally to typewriters and word processors and to keyboards for information input systems such as small scale computer and display terminal ensembles, and more particularly, to a keyboard arrangement wherein the array of keyboard keys may be divided into at least two sections, the sections being separate from one another. In addition, this invention also relates to typewriters and word processors of the type wherein both, the reference material to be worked from and the information display, can be positioned centrally in front of the operator.

Known keyboard arrangements of the type which heretofore have been used in typewriters, computers and other business machines are arranged so that characters, numbers and symbols appear on keybuttons, or actuators, which comprise the keyboard. The keys comprising the keyboard are arranged adjacent to one another in a fairly compact grouping on what amounts to a single keyboard, the keys usually being arranged in a grouping of a plurality of straight rows which may be slightly offset from one another to form columns of keys which are not perpendicular to the rows of keys. In most business machines, the keyboard is arranged to slope generally downward towards the operator, whereby succeeding rows of keys in a direction away from the operator have incrementally higher elevations than the immediately preceding row of keys.

Certain business machines, such as typewriters and computer input keyboards are intended to be operated using the fingers of both hands, at least by a skilled operator. In such machines, where the keys are adapted to be operated by the fingertips and are therefore accordingly spaced, the operator must bring his or her hands over the keyboard, in close proximity to each other, and in a particular orientation so as generally to align the fingers with the rows of keys. From this position, the operator must depress appropriate ones of the keys with the fingertips. Particular assignments of characters, numerals and punctuation marks to specific ones of the keys have become sufficiently popular in a standardized form that an operator may learn the particular arrangement of keys and distribution of characters so that typing becomes a less mindful task, insofar as the translation of a desired character into a corresponding depression of a key is concerned. This conversion of a mentally desired item of information into a physical act which causes recording of that information is thus in the form of a desirable, learned habit so as to reduce the amount of attention and concentration required to perform that act. Thus, the mind of the operator is freed to perform other concommitant activities. The penalty for this convenience is that, for each hand, only one predetermined reference position on a particular keyboard layout is allowable, to permit the key selection process to become a learned response, with the attendant result that the positional requirement for the hands in turn dictates an uncomfortably narrow range of allowable positions for the rest of the operator's body. Further, observations of typing motions on an objective and subjective basis lead to the hypothesis that the learned motion of the fingers is performed in a relationally constructed direction away from a reference zone, and is therefore not a motion which is absolute in space. Operators of keyboards generally find reference positions for the fingers over a set of keys, four for each hand, that are termed "home row" positions. The edges of the thumbs rest on leftward and rightward portions of the laterially extending spacebar. It is a further hypothesis that the finding of a key which is not located on the home row is achieved with a learned geometric reference to the home row positioning of the particular finger to which that desired key is assigned in the learning process. An experienced operator therefore develops a mind picture of the keyboard which mind picture allows the home row location of the fingers of one hand to be reference for the fingers of the other hand. In essence, only one hand needs to be located on its home row key set, and the keys which are assigned to be operated by the other hand are immediately found by an almost continuous motion of those other fingers which come first over the home row keys and then travel to the desired key. It is therefore postulated that one hand assists in positioning the other, and the operator will accordingly keep one hand on or near its associated home row key set at times when the other hand is required to travel away from its associated set of home row keys to perform some relatively distant task. On known mechanical typewriters of the type having a moving platen carriage, one hand of the operator was often required to leave the keyboard for operating the carriage return to begin a new line. Out of habit, the other hand would hover over the associated home row keys, so that the hand which was used to return the carriage could return quickly to the appropriate position over its set of home row keys to resume the typing task.

The swiftness of such a return to home row positions in a motion which is several inches long, while the head and eyes remain aligned to the copy at the side of the typewriter suggests strongly that these motions are not guided by sight, but by a learned inter-relationship memory of the relative positions of the two home row assignment areas. The misalignment of the returning hand over keys other than the home row keys will result in the inputting of completely wrong information with that hand. Of course, removal of the wrong information from the text and substitution of the correct information is both frustrating and wasteful of time. Thus, if higher typing speeds are to be achieved, the return of the hand to the home row positions should be facilitated by providing tactile feedback to the operator. Some known information input systems utilize deeper-than-usual depressions in the top surface of each home row key, or tiny cone-shaped protrusions in the normal disc-shaped key top that gently prick the fingertip to allow home row alignment certification when the fingertips skim the key tops in a searching-for-base-reference mode.

In some known modern business equipment, such as modern computer and word processing equipment, where the information input task may consume several hours in each work day, the sloping keyboard is made to be detachable from the bulk of the equipment and connected thereto by a length of electrical or optical cable. This provides the convenience of permitting the operator to optimize, to some degree, the location and orientation of the keyboard unit. With this range of adjustment, some operators find that the heel of the hand can be rested on the front edge of the keyboard during alphabetic typing, and that the heel rest need only be abandoned for numeric or special function key depression at the extreme edges of the keyboard. In addition, European keyboard vendors have provided a keyboard with a low vertical height and a resting surface at the front thereof for communication with the underside of the wrists and these keyboard modifications now influence U.S. keyboard design. However, these resting points serve only as temporary palliatives which highlight the need for design changes in keyboard to allow either faster typing or a form of typing which does not become stressful when continued over long periods.

Prior efforts toward solving the above-mentioned problems have not been practical and in some cases have not been used at all as they neither solve as many problems for the operator as they create, nor do they overcome the learning problems intrinsic in using a keyboard which incorporates a major change in character assignment of the keys, at least in comparison to a widely used standard keyboard layout such as the Scholes/Christoper QWERTY. Apart from the teaching of the present improvement is a way of looking at the problem in a particular manner, and with such a perception, that the information presented in this disclosure is more readily understood.

It is a problem with known keyboards, including the more modern and improved keyboards described hereinabove, that an operator of such equipment must distort the natural and normal physiology of his or her body to achieve a body position which is suitable for operation of the equipment. The assumption of non-optimum physiological positions by operators of information input equipment produces tensions in the operator's muscles and joints which are tiring and fatiguing and can result in slowed typing speeds, an increase in the number of errors, and generally reduce operator productivity. Such problems are especially acute in the business environment where high productivity and accuracy in required work tasks must be maintained over large portions of a business day.

As indicated, the problems associated with conventional keyboards which increase operator fatigue and reduce operator efficiency are at least partially based upon the physiologically sub-optimum postures and positions which must be assumed by operators of such equipment. Conversely, an improvement in the physiological factors which are present at the interface between an operator and a machine would produce a corresponding increase in operator efficiency and morale. The physiological difficulties which are associated with conventional keyboards can be visualized as follows:

Reduced to its barest essentials, the human upper arm is but a radial extension which pivots about a shoulder joint. The human forearm is a further radial extension, pivoting at the wrist. Thus, a human arm and hand can be viewed as a sequence of three radial extensions. Each of these joints is operated by muscles which are activated by nerve signals, and because the muscles have attachment points near these joints, the range of achievable motion caused by such a tension or relaxation of the operating muscles limits the range of motion available at each joint. Further, if the position required to be assumed by the joint requires a significant muscle ennervation, there is a biochemical disadvantage to the human in that this high level of ennervation leads to perceptions of fatigue, pain and other distractions from the required task.

Viewing such a physiological arrangement from the standpoint of movement mechanics, it is evident that in the normal typing position, the upper arms extend essentially vertically downward, the lower arms are in a substantially horizontal attitude, and the hands move in a horizontal plane in arcs which extend outward from imaginary centers through the wrist joint of the operator. In other words, if the hands are placed next to one another near the center of the operator's abdomen, an effort to move the hands away from the operator in a horizontal plane while the upper arms remain substantially vertically downward would result in two symmetrical arcs which begin at the front center of the operator and extend radially away from the operator in opposite directions. Such arcs represent natural motion paths of human hands. By involving the lower arms, the movement of the hands as carried at the other end of the lower arms will also be arcuate, but with a larger radii extending outward from an imaginary centerline through the elbows. If the upper arms are vertically downward, this centerline also runs through the shoulder joint as well. However, if it is desired that the hands track a straight horizontal line extending across the front of the operator, parallel to the rows of keys, it is clear that such motion cannot be achieved by either simple wrist pivoting or by simple elbow pivoting. Neither can it be achieved by any combination of the two. Instead a compensating motion must be provided by a flexing the fingers, such flexing motion being not merely for convenience in the operating the keys, and not merely for reaching keys on adjacent rows, but rather to compensate for the physiological incapability of the wrist and/or lower arm pivoting to track such a keyboard alignment.

Alternatively, or in combination, the compensation may be provided by a motion of altering the upper arm position, or shrugging the whole shoulder joint upward. This type of motional compensation changes the planes of rotation of the wrist and elbows, and can result in an awkward backward rotation of the upper arm away from the torso. In either case, depending on the physical style of the operator, the shoulder muscles must either hold the upper arms backward and outward or compress them inwardly, and the wrists must compensate for such motion by further lateral angles, increasing the potential for cramping by forcing positions away from the most relaxed and effective muscle-neutral position.

The extent of such contortions and compensations in the arm, shoulder, and wrist joints and muscle systems varies with the particular physiology of each operator, and to a large extent, with the relative width of the operator with respect to the width of the keyboard. For a given keyboard size, the wider the operator's shoulder joint separation is compared to the width of the keyboard, the greater are the muscle forces which must be applied to achieve the required articulations and compensations. To reduce the necessity for using these unfortunate patterns of contraction and compensation, it has been found that a typical muscle-neutral position, i.e., the muscle position which unlocks the shoulder girdle, is that position which allows the operator to extend the forearms forward and straight out at a distance apart which approximates that of the width of the shoulder joints.

In at least one known arrangement, a pair of keyboard sections are arranged on relatively long supports in an orientation whereby the hands of the operator hang in a relaxed manner at the operator's side. In other known arrangements, the position of the keyboard sections is adjustable with respect to an operator's chair, which is provided with arm supports which help to reduce fatigue and tension.

It is, therefore, an object of this invention to provide an improved keyboard arrangement whereby the muscle tensions which are experienced by operators of convention equipment are reduced to a minimum. Such a reduction in muscle tension will allow an operator of the equipment to achieve improved efficiency during the working day with less distress from distorted musculature.

It is a further object of this invention to provide an improved keyboard arrangement without deviating from a standard keyboard layout, such as that which is known as the "QWERTY" keyboard as pioneered by Sholes/Christopher, and others. The use of a standard keyboard layout will permit the advantages of increased efficiency without the need for extensive retraining of the operator to a non-standard keyboard layout. Of course, the present invention is not limited in its utility to the standard QWERTY keyboard layout, and it is therefore an object to improve information input keyboards which are arranged under different conventions, such as the Dvorak keyboard layout.

It is yet another object of this invention to provide an improved keyboard arrangement having a position which can be adjusted so as to be individually optimized to, and by, each operator thereof. In this manner, each operator can maximize his or her comfort during operation of the equipment, and minimize operator fatigue, as by readjusting the particular typing position geometry over a long business day.

It is also an object of this invention to correct misinput of information when fingers are displaced from home row positions.

It is a yet further object of the invention to provide a transitional position and adjustment of the keyboard from the present familiar conventional keyboard arrangement to an optimized, by optional, arrangement so as to provide a bridge for gradual and non-threatening relearning by an operator, and one which can be accepted without undue learning since the familiar keyboard configuration that is perceived by the operator as being safe and non-challenging can be regained by the operator at any time.

It is a problem that the subjective feel of a keyboard is a significant factor in determining whether a given keyboard can be used successfully for information input, and that the tactile feedback character of the keyboard, and the stability of chosen geometric arrangement of keyboard components, are both important determinants of whether stress is reduced significantly over long periods of inputting information.

It is, therefore, a yet further object of this invention to provide a satisfactory non-visual feedback sensation to the operator indicative of home row key positions at the operator's fingertips, and also to provide visual indication of the identity of other-than-home-row keys which are usable when the keyboard components are oriented in a non-horizontal position.

It is yet still another object of this invention to provide a compact and stable means for achieving and holding the particular adjustments of keyboard segments when adjusted by the operator so that the mechanical rigidity, as reflected in the subjective feel when depressing ones of the keys on the keyboard, is substantially unchanged from the rigidity generally associated with the resting of the keyboard on a flat horizontal surface, such as a desktop.

It is a further problem with known business systems, particularly word processing systems where an operator must input information provided from sheets of copy so that the inputted information is presented on a display screen or printed on a page, that the repeated transferring of the operator's eyes between the input copy sheet and the output display page or screen causes visual fatigue. Such fatigue is believed to result from the fact that the operator is required to adjust the focus of his or her eyes and, perhaps, the vertical position of the head for each such transferrence of vision locale. In addition, when the input copy sheet is placed to one side or the other of the keyboard the operator must certainly rotate the head for each such vision locale transference.

It is therefore, a still further object of this invention to provide a system whereby an operator can enter information into an information processing machine while minimizing the fatigue which is produced as a result of highly repetitive visual refocussing, a difficulty that often grows worse with increasing age as eye focussing and head-rotating muscles operate more slowly over decreased ranges of response.

It is yet another object of this invention to reduce substantially muscle fatigue which is produced by repeated turning of the neck of the operator between the position of the input copy sheet and the output display medium, and so that such change of vision locale is accomplished by only vertical head movements, and that such vertical head motion is minimized.

It is still another object of this invention to permit and facilitate portable site operation of information input equipment by utilizing the sectional aspect of the keyboard, wherein portability is encouraged by reducing certain dimensions of the equipment in which the keyboard is placed, notably portable word processors and terminals.

It is a yet still further object of this invention to provide a word processor configuration for a portable information input terminal which utilizes a sectional keyboard, and which optimizes the hereinbefore stated human factors aspects for operator comfort and efficiency at such portable sites, without a significant reduction in transportability.

SUMMARY OF THE INVENTION

The foregoing and other objects are achieved by this invention which provides an arrangement for facilitating communication between a human operator and an information processing machine such as a typewriter or a computer. Information is entered into the information processing machine by the human operator via a keyboard which is splittable into first and second keyboard sections which contain respective pluralities of keys. When joined together, the keyboard sections form a unified keyboard which appears as a conventional keyboard. However, when separated, each such keyboard section is adjustable with respect to the position of the human operator so that the operator works comfortably, and muscle tensions in the operator are substantially reduced over conventional systems during communication of information.

Table One presents a comparison of the joint positions which must be assumed when using a U.S. standard keyboard, a European low profile keyboard with a wrist rest, and a splittable keyboard constructed in accordance with the invention. The data presented in this table illustrates that the inventive splittable keyboard reduces the need for awkward joint angulation.

TABLE ONE

Comparison of Joint Motion with Keyboard Types.

| JOINT | U.S. | European w/ wrist rest | Splittable* |
|---|---|---|---|
| Shoulder | | | |
| Rotation in | 30° | 30° | 0–10° |
| Neutral Plane | Internal | Internal | Internal |
| Forward Flexion | 45° | 40° | 0° (none) |
| Abduction | +10 ∓10° | +5 ∓5° | 0° |
| Elbow-Forearm | | | |
| Pronation | 90° | 90° | 45 +30 −45° |
| Flexion | 100° | 100° | 90° |
| Wrist | | | |
| Palmar Flexion | 30° | 40 ∓20° | 0° |
| Ulnar Deviation | 30° | 30° | 0° |
| Fingers | 45–40–40° | 50–45–45° | 15–10–5° |
| 3 section | | | |
| Flexion | | | |

When closed, the splittable keyboard can match either the U.S. keyboard or, if provided with the wrist rest, the European DIN Standard keyboard. The values listed are for 10 inch split width, 45° slope orientation. Assumes body and keyboard forward-backward axes are in alignment (for detachable keyboards).

Of the above-noted keyboards, the U.S. keyboard is the most widely used. However, muscular or postural pain results after only several hours of use. The European DIN standard keyboard has a low profile and is gaining in popularity. A wrist rest reduces fatigue by reducing some of the weight which is borne by the forearm, elbow and shoulder joint. With respect to the splittable keyboard, this keyboard can be unified to be essentially one continuous keyboard resembling either the U.S. or the European keyboard. The data pertaining to the splittable keyboard is taken with the keyboard section separated at least ten inches and sloped out and down by 45° to reduce muscle tension.

In a preferred embodiment, an output display for providing responsive information from the information processing machine to the operator is disposed at a location which is intermediate of the separated keyboard sections. The keyboard sections, when joined together, produce an arrangement of keys which is in accordance with a conventional keyboard arrangement, such as the well known QWERTY, QWERTZ, and Dvorak keyboard layouts. Each keyboard section contains those ones of the keys which are reserved, in accordance with established typing convention, for respective right and left hand actuation, including respective leftward and rightward sections of the space bar. More specifically, the keyboard section which is located on the right hand side of the display, as viewed by the operator, contains the keys which are to be actuated by the right hand of the operator. Similarly, the keyboard section located on the left hand side of the display contains the keys which are intended to be operated by the left hand of the operator. Accordingly, the operator of the inventive arrangement need not be retrained in the key position layout, or placement assignment of the individual keys, but may apply the already-learned typing knowledge.

It is a significant advantage of the present intention that, when the keyboard sections are joined together, a conventional unitary keyboard is produced which is indistinguishable both in use and in appearance, from a standard, non-splittable keyboard. Such a unitary keyboard appears in every respect which affects its operation to be of the standard type normally furnished, and therefore without any difference in the spacing between adjacent keys on different keyboard sections, as compared to the spacing between keys on the same keyboard section. The present keyboard is therefore particularly suited to facilitate the switch-over training from conventional typing technique to split keyboard information inputting technique.

It has been learned that keyboard operators function utilizing a mental representation of keyboard layout, in effect, a keyboard mind map, wherein the essential keyboard information, particularly the alphabet and frequently-used punctuation marks, is maintained. By the use of such a mind map is the technique of touch-typing effected. It is a unique advantage of the present splittable keyboard arrangement that an operator having only conventional information inputting experience can immediately use the inventive keyboard while it is in its joined condition. However, the keyboard can then be split, for a small distance at first, until the operator adapts to the technique of operating a split keyboard, in effect, creating a gapped mind map of previously learned relationships of keys which corresponds to the split nature of the actual keyboard. Gradually, the keyboard sections are separated by greater distances until the operator reaches a comfortable, muscle-neutral distance, reflecting itself most significantly in the reduction in tensions in shoulder and upper arm muscles. The operator can then proceed to tilt the keyboard sections, gradually if desired, until a comfortable lower arm and wrist position is achieved. Advantageously, the keyboard can be reunited quickly if the machine is to be used by an operator who has only used a conventional keyboard, or if the operator who is learning the use of the split keyboard feels at all uncomfortable about any aspect of that learning and wants the security and total familiarity of the old, non-split keyboard. Thus, the capability of rejoining the separate sections into a single whole keyboard which is functionally indistinguishable from a conventional one-piece keyboard, obviates the need to purchase and maintain a standard, one-piece keyboard to be interchanged with the splittable keyboard when the machine is used by different users. Conversely, stable locking and graduated measurement means are provided so that, as an experienced operator becomes comfortable with splitting the keyboard, the distance and tilt parameters which determine the location and position of the keyboard sections can be noted, and reset such that operators with split keyboard experience can quickly achieve a predetermined preferred keyboard geometric setup without new experimentation.

It has been learned that operators who are already skilled in operating a particular keyboard layout, such the Sholes/Christopher QWERTY or Dvorak layouts, will learn split keyboard technique in a very short time. This minimal time is rapidly recaptured in view of the enhanced efficiency that a split keyboard allows over long periods of inputting information.

According to a further and particularly advantageous aspect of the invention, each keyboard section is mounted on an adjustable support carrier which permits and facilitates directions of adjustments so that a highly customized and individualized orientation of the keyboard sections may be achieved in a stable manner for each operator of that keyboard. For example, an illustrative embodiment of a keyboard support carrier permits horizontal translation along a first substantially horizontal path, horizontal rotation in a substantially horizontal plane, horizontal extension along a second substantially horizontal path, and vertical rotation in a substantially vertical plane. In accordance with this preferred embodiment, an elastic or resilient counterforce device, which may be a spring, is provided to counteract the tendency of the keyboard sections to hang directly downward when the keyboard support arrangement is unlocked to facilitate positional adjustment thereof. When the left and right sections are tilted away from the horizontal, it can become difficult for the operator to identify the keys visually by the labels imprinted on the tops of the keys. Some known information input keyboard keys are provided with alternate symbols on the front of the key actuating covers, or keycaps, which augment the keytop markings. A preferred embodiment of the invention places additional markings, repeating the top inscribed markings on the sides of the keycaps so that when the keyboard sections are tilted, the markings are readily visible to the operator. This usually would take the form of auxiliary markings on the innerside and rearside of the keycaps in a left or right section of the keyboard. Thus, when using the keyboard in a side tilted mode, the innerside markings become visible, and when the keyboard section has only a forward tilt, the rearward markings become visible. The need to identify the keys visually is largely obviated, at least for the portion of the keyboard which is covered during touch typing, particularly when using the preferred invention which gives a particularly good feedback to the operator indicating that the fingers placed are on the home row keys.

In a preferred embodiment of the invention, the misalignment of the fingers on the home row keys is immediately signaled to the operator to minimize the amount of wrong text characters entered, and the operator has the option of selecting an operational mode in which any characters depressed when at least one of the two hands does not have fingers correctly placed on the home row will inhibit character entry and present a selectably visual, audible or tactile warning signal to the operator. If the true position of the fingertips of the hand are known in relationship to the home row keys, an optional information manipulation mode can correct defective input, while signaling that the fingers should be repositioned correctly.

Table Two presented below shows the effect of a mispositioning of the hom row fingers, and demonstrates that a code linking of finger position and keys depressed can correct much of the defective information input. Of course, this invention is not limited in its usefulness in correcting misplaced home row finger positions to splittable keyboards wherein altered geometric interrelationships are utilized beneficially, but also has usefulness in the standard, single plane conventional keyboards as well.

It is to be noted that many typists obviate the need for such error correction by consistent mindful, visual checking that all fingers are on correct home row positions before typing starts, or restarts, after hand motions away from the keyboard have occured. However, many beginning typists are not so careful, and some experienced typists are willing to take some risks of error to gain speed by reducing mindfulness at certain stages in the typing process. There is a clear trend towards less psychological penalty for error in learning typing habits if the operator has the use of a visual, or soft display, in comparison to the use of equipment wherein there is only provided the direct typing of characters and symbols onto the surface of the paper typing with no easy correctional cycle. Also, in the preferred embodiment, the relaxed arm and hand positions will have an unfamiliar situational effect, or feel for the operator who is learning to use a splittable keyboard, and any reduction of penalty for inopportune hand repositioning on the home row keys will facilitate such a learning cycle.

TABLE TWO

Home Row Finger misplacement effects a. BOTH hands in *correct* home row position: now is the time for all good men to come to the aid of their party.

b. LEFT hand mispositioned one keytop to the *right:* noe id yhr yimr got sll hoof mrn yo vomr yo yhr sif og yhrit pstyy.

c. RIGHT hand mispositioned one keytop to the *right:* mpw os tje to,e fpr a;; gppd,em tp cp,e tp tje aod pf tjeor aftu d. RIGHT had mispositioned one keytop to the *left:* biw us tge tune fir akk giid neb ti cine ti tge aud if tgeur oartt.

Notes:

[1] It is difficult for the fingers of the left hand to be mispositioned to the left on a Selectric "self-skirting" keyboard because the keytop immediately to the left of the "a", the leftmost home row character, is the locking key for the shift, and is usually fashioned so as to have a depression about ½ inch wide at that point.

[2] It is equally rare for one hand to be placed on the row above or below the home row keys. It is almost as rare for both hands to be placed on the row above the home row, because the position of the side of both thumbs on the space bar usually gives the operator indication of such a mispositioning, and the input text must usually be in lower case with no numberins or upper row symbols, since "reaching" for these keys immediately signals the operator that something is wrong.

But, when it does happen:

BOTH hands in *correct* home row position: now is the time for all good men to come to the aid of their party.

BOTH hands placed on the row *above* the home row: h93 8e 6y4 68m4 g95 woo y99r m4n 6o vom4 6o 6h4 wif ot 6h4i5 pw56yl

[3] Finger mispositioning does not destroy the *relative* finger motion relationships, so that a mistakenly selected character and a known mispositioning on home row can be used to form an invariant transliteration table, so that most of the errored text can be translated into the intended character text. Table look-up code transliteration is an eminently practical and economic task for the present solid state logic art. Certain transliterations can be tagged as "illegal", or "improbable" such as hitting the "carriage return" function key when a special adjacent function, such as brackets was desired. In this case, the carriage return would be inhibited, and either the brackets would be shown, or a special "error symbol" would be displayed.

In a still another embodiment of the invention which is preferred for information input tasks requiring special manipulational tasks, an additional key series is utilized typically but not necessarily of one row of keys, arranged above the plane of the separable sections, and placed in a zone extending laterally from the leftmost edge of the left section to the rightmost edge of the right section. These keys act as auxiliary function input keys to the usual keyboard layout, be it of the Scholes/Christopher QWERTY, Dvorak or other arrangement. These auxiliary keys are used to provide special functions, as for editing in word processing, frequently used commands in programming, or visual image control keys during graphic manipulations. Since most input materials consist primarily of text which may be inputted using a touch-typing system, these auxiliary keys are rarely learned as they are depressed substantially less frequently than the usual keyboard keys, and it is thus preferable to put them in a location which allows corresponding motions to be visually assisted so that finger location movements do not take an undue amount of time and thus slow down the information handling tasks.

In a further embodiment of the invention, a printer is provided for producing a permanent record of the communication between the human operator and the information processing equipment. Such a printer is preferably located essentially between or behind the keyboard sections and either comprises or is arranged beyond the display from the operator. In a preferred embodiment, the printer is arranged opposite to the operator's body such that, as the printed copy is being prepared, the operator may view the printed record without turning his or her head.

In accordance with a further aspect of the invention, a display screen provides an alterable, visible record of the various stages of processing information after keyboard entry of the information into memory devices within the processing machine by the human operator. The display screen is preferably located directly in front of the operator, and preferably in a region intermediate of the separated keyboard sections. The preferred embodiment presents a configuration which allows the display screen to be placed on the centerline and above the keyboard while the keyboard sections are joined, and then moved to a position between the separated sections when the operator wishes.

It has been found that the placing of such display equipment on centerline with the operator avoids the side-to-side neck twisting required during use of other arrangements, and that the tilting of the head up and down is less fatiguing than moving the head from side-to-side. It is believed that this results from the fact that the up and down motion is performed using small muscles which are adapted, and typically are already being used to support the head upright. The twisting of the head from side-to-side, in contrast, uses a greater number of muscles, and these muscles are not developed in the same way as those causing up-down tilt motions. This may result from the fact that gravity does not act laterally so as to cause compensating corrections to be required by the lateral motion muscle sets.

Additionally, this preferred embodiment of the invention is made useful for those equipment operators who frequently wish to transport their equipment ensemble to a new work site. An especially useful embodiment consists of a word processor consisting of components which are packagable into an especially portable configuration, but after reaching the intended new job site, the componentry can be reconfigured to provide the benefits of the advantageous arrangements hereinbefore presented. The ability to split the keyboard into two sections is yet a further aid to providing a convenient configuration of components for portability, while allowing operators to chose the particular keyboard coonfiguration which is best for them in the particular job needed at the new work site.

For those operators whose information input and manipulation tasks are sufficiently critical to require the viewing of a visual display which temporarily substitutes for the final printed record, the most useful such display would present information representing a full page of text at finally printed. This full page representation obviates the need for repositioning the visual image for viewing called "scrolling" which takes time and tends to make the operator less sure of just what the printed page might look like without frequent rescrollings. The more demanding the information manipulation task is, as for layout of text that must present information in an especially appealing way, or appear closely similar to a text produced in a print shop, the more critical is the need for a full page display. However, such quality display is difficult to achieve because the need for resolution on the cathode ray tube visual display is maximized when a full page of text is to be presented this is especially true in situations where the character shapes shown on the screen are desired to represent closely the actual printed characters. This embodiment of the invention provides a configuration that affords portability while retaining the capability of full page text display by repositioning the display in a manner not used in present information manipulation equipment.

BRIEF DESCRIPTION OF THE DRAWINGS

Comprehension of the invention is facilitated by reading the following detailed description in conjunction with the annexed drawings, in which:

FIG. 1 is an isometric representation of an embodiment of the invention wherein first and second keyboard sections are joined together to form a continuous keyboard with a display thereabove;

FIG. 2B comprising FIGS. 2BI and 2BII, is a front isometric representation and a side view of a side angle adjustment and position stabilizing system;

FIG. 2C comprising FIGS. 2CI through 2CVI shows various details of the side angle adjustment and position stabilizing system;

FIG. 2D is a simplified side-view representation of the side angle adjustment and position stabilizing system;

FIG. 4 is an isometric representation of the embodiment of FIG. 1 showing the keyboard sections separated, the manner in which they rotate vertically, and the positioning of a display therebetween;

FIG. 7A is a simplified side view of the portable word processor arrangement of FIG. 6, showing the addition of a rear corner lid;

FIG. 7B is a phantom view of the rear corner lid of the portable word processor arrangement of FIGS. 6 and 7A with the two keyboard sections emplaced within, and FIG. 7C is a simplified isometric representation of the portable work processor arrangement and the splittable keyboard;

FIG. 8A is an isometric representation of keycaps for use in a home row showing a tactile and positional feedback arrangement.

FIG. 8B is a simplified block diagram of a touch sense output circuit;

FIG. 9A is an isometric view of a keycap with a tactile and positional fiber row installed thereon;

FIG. 9B is an isometric view of a keycap with a bent fiber tactile and positional sensing fiber installed thereon, and FIG. 9C is a simplified block diagram of the touch sense output circuit for use with the embodiment of FIGS. 9A and 9B.

DETAILED DESCRIPTION

Figure 2A:
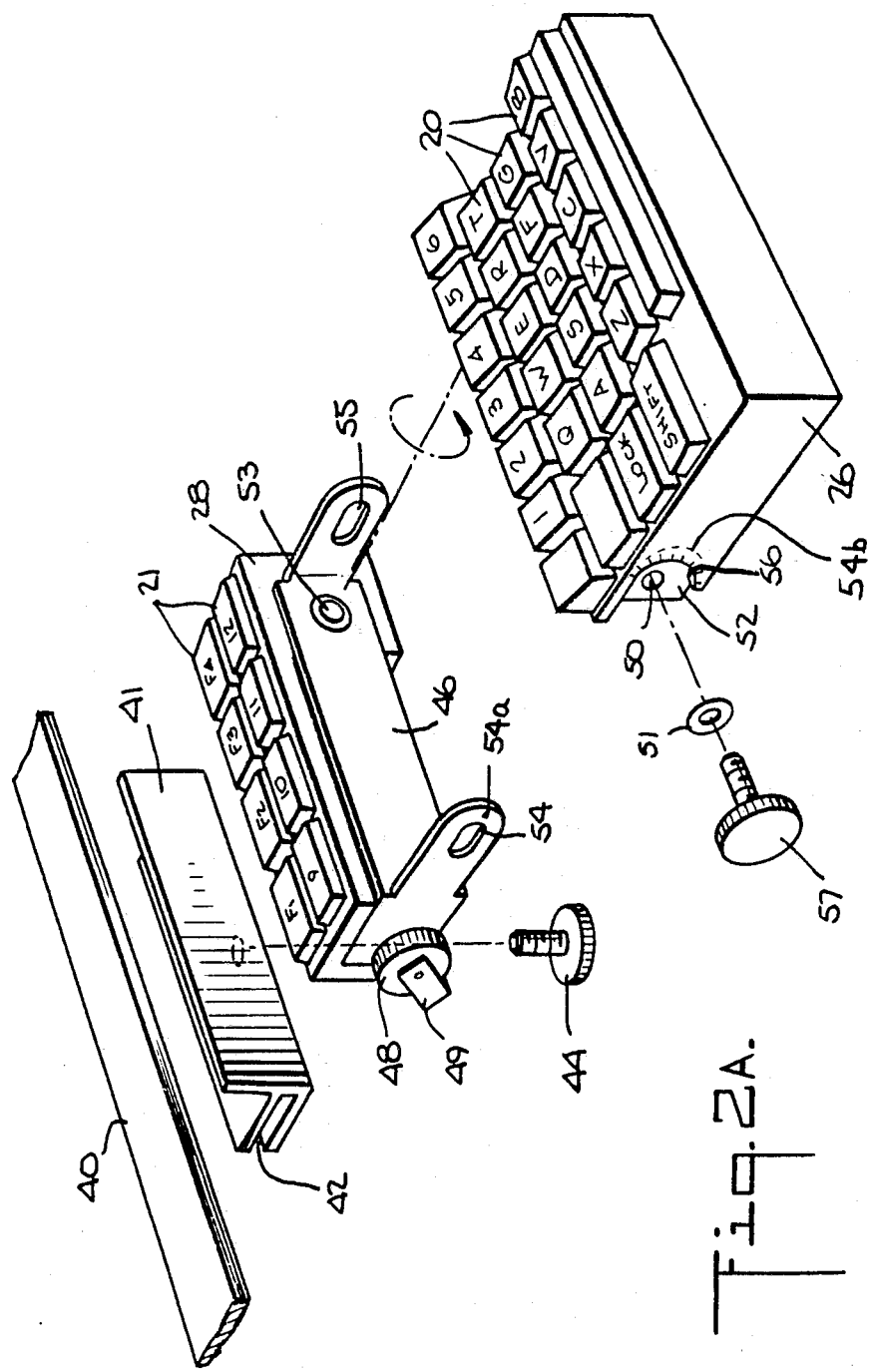
FIG. 2A is an isometric representation of an embodiment of the invention showing an illustrative mounting arrangement for a left-hand keyboard section.

FIG. 1 is an isometric representation of an embodiment of the invention wherein an information processing machine 10 having a display 12 and a keyboard which is generally designated 14 is disposed on a supporting surface. In this specific illustrative embodiment, keyboard 14 is provided with a plurality of keys 20 which, in this embodiment, are assigned to specific characters corresponding to the known QWERTY keyboard assignment layout. Keyboard 14 is further provided with a plurality of keys 21 bearing respective designations $F_1$ to $F_{16}$ thereon.

Keys 21 are not conventionally included in the QWERTY keyboard assignment layout, but are provided to initiate keyboard functions, computer control functions, or other functions, determinable by software or the operator.

Keyboard 14 is, in this embodiment, dividable into four keyboards 26, 27, 28, and 29. A heavy line 30 illustrates the manner in which keyboard 14 is dividable into a left portion having keyboards 26 and 28, and a right portion having keyboards 27 and 29. It is a significant aspect of the present invention that, when the keyboards, particularly keyboards 26 and 27, are brought together as shown in this figure, the interkey spacing between adjacent keys on different keyboards, such as keys 6 and 7, T and Y, G and H, etc., is not any different from the interkey spacing between adjacent keys which are both on the same keyboard portion. In other words, the distance between keys R and T on keyboard portion 26 is the same as the interkey spacing between keys T and Y on respective keyboard portions 26 and 27, respectively. Thus, when joined, keyboard portions 26 and 27 present a continuous, standard QWERTY keyboard layout which is indistinguishable from a conventional, unitary keyboard. As shown, the space bar is also divided into a left portion 32 and a right portion 33. Actuation of either of these portions will effect the known spacing function.

FIG. 2A is an isometric view of the left half of keyboard 14 which includes keyboard portions 26 and 28. Keyboard portions 26 and 28 are shown in an exploded representation so that the details of a specific illustrative mounting arrangement are clear. The mounting arrangement is provided with a track 40 which is shown in fragmented form. As shown in FIG. 1, track 40 is arranged beneath supporting surface 15 and affixed thereto by a known means (not shown). A mounting bracket 41 shown in FIG. 2A is configured to have a channel portion 42 which engages track 40. The engagement between channel portion 42 and track 40 is slidable as long as a locking screw 44 is not tightened. Locking screw 44, in this embodiment, is threadably engaged with the lowermost leg of channel portion 42, and when tightened, extends through the lowermost leg and firmly communicates with track 40, thereby securing mounting bracket 41 to keyboard portion 28. Such affixation may be achieved by screws, bonding, or any other affixation manner. Keyboard portion 26 is pivotally coupled to a side angle rotation bracket 46 which is held to auxiliary keyboard section 28 by an axle 53. Side angle rotation bracket 46 has two forwardly bent sections which contain a pair of slotted apertures 54 and 55. Adjustable keyboard section 26 has a threaded hole 50 in a corner recess 56, with the depressed surface adjacent to threaded hole 50, shaped as a somewhat spherical surface 52. A pivot screw 57 threadably engages with threaded hole 50, and a resilient washer 51, such as Belleville washer is inserted between the head of pivot screw 57 and surface 52 so as to maintain the desired forward tilt angle of keyboard section 26 when pivot screw 57 is tightened. Spherical surface 52 allows the operator to select a moderate amount of horizontal crossangle mounting of, for instance, left keyboard section 26, in addition to the desired setting of front-back tilt angle, before tightening pivot screw 57. A side angle adjustment knob 48 and a knob lock 49 are placed at the leftmost face of auxiliary keyboard section 28. Thus, in operation, the mounting arrangement shown in FIG. 2A permits horizontal translation along track 40 by loosening knob 44, forward tilt angle adjustment by loosening knob 57, and side angle adjustment by loosening knob 49.

FIG. 1 also shows that the amount of horizontal translation of the keyboard sections can be determined by gradations disposed on a rule 13a disposed along back surface 15. FIG. 2A shows that once knob 57 has been loosened and keyboard section 26, for example, pulled away from keyboard section 28, the amount of forward tilt angle can be determined by a pointer 54a disposed on bracket 46 and gradations 54b disposed on keyboard section 26, for example.

The upper view in FIG. 2B is a highly simplified isometric representation of auxiliary keyboard 28 with auxiliary keys 21 shown only schematically for simplicity. Side angle adjustment bracket 46, attached to auxiliary keyboard housing 25 by axle 53, is shown partially rotated in a downward, or counter-clockwise direction. A group of blades 71, each of the same sector shape, interconnects at full extension, and is joined at the periphery by a blade belt 79. The combination of blades 71 and belt 79 form a stable and adjustable fan-shaped support for side angle adjustment bracket 46 when it is rotated out of a horizontal position. The view in FIG. 2BII is a view from the left of auxiliary keyboard housing 25 with the leftmost end thereof removed for clarity. Blade belt 79, which is moderately flexible, is formed in a concave, arcuate fashion, and extends downwardly from a belt storage area 87 at the top of the housing. A belt end pin 85 joins side angle adjustment bracket 46 to the lower end of blade belt 79, so that the angle of side angle adjustment bracket 46 to the horizontal is controlled by rotation around axle 53 as induced by movement of belt end pin 85. The rightmost blade 71a is also joined to blade belt 79 by belt end pin 85. As blade belt 79 is withdrawn from belt storage area 87 by rotation of side angle adjustment knob 48, rightmost blade 71a also rotates out of horizontal around axle 53. As rightmost blade 71a continues downward, an upper blade vee 73 interconnects with a lower blade vee 74 on the base of the next blade 71b. Thus, after sufficient rotation about axle 53, each blade 71 grips its neighbor by interlocking V-shaped members.

FIG. 2BI shows that the amount of side angle adjustment can be determined by gradations 49a arranged on belt 79.

In FIG. 2CI, II, and III, a front and two opposing end views of blade 71 are shown. Each sector-shaped blade 71 has a blade hub 76 in which is formed a clearance hole 78 for passage there through of axle 53. At the leftmost edge of the front view, a series of blade teeth 75 are formed, each having a blade tooth base 77 formed as a partially closed circle, so as to grip a correspondingly shaped series of belt inner tooth tips 83, as shown in FIG. 2CIV. In the left end view of blade 71, upper blade vee 73 and lower blade vee 74 show prominently. FIG. 2CIV shows a group of four blades 71 in downward spread position, with the vee sections interlocking. Shown in exploded form for clarity next to this fan shaped ensemble of blade 71 is blade belt 79. Blade belt 79 has a notched outer surface on either side of a row of belt inner teeth 81, formed as an outer pair of notched belt sides 82 which cover in a hooded manner the inner tooth structure, and which when extended, protect an operator from snagging clothing or fingers on inner teeth 81. A rounded set of outer belt teeth 80 is placed on the convex arcuate side of blade belt 79, and is used by side angle adjustment knob 48 of FIG. 2-B to control the amount of blade belt 79 leaving belt storage area 87. A front and cross-sectional view of blade belt 79 is shown in FIG. 2CV and VI. A set of reinforcing cords 84 that serve to increase the longitudinal strength of blade belt 79 is best shown in the cross-sectional view.

In FIG. 2D, a front diagrammatic view of the side angle adjustment and position stabilizing system is shown. Blade belt 79 is withdrawn from belt storage area 87 under rotational control of a side angle gear 86, which is in turn rotated by side angle adjustment knob 48 (not shown here). As blade belt 79 passes the corner belt inner teeth 81 engage blade teeth 75. As the blade belt continues downward it carries with it blade 71, and firmly interlocks blade belt inner tooth tips 83 with blade tooth base 77, so that blade 71 is firmly joined to blade belt 79. The combination of locking vee surfaces on a blade web 72 in combination with the interlocking of blade teeth base and belt tooth tip provide a stable mounting for side angle rotation bracket 46 at any formed rotation angle of blades 71 acting to rotate around axle 53. In the specific illustrative embodiment discussed herein, a mounting arrangement similar to that described above with respect to FIGS. 2A-2D is provided for adjustably mounting keyboard portions 27 and 29. However, many modifications may be made to the amounting arrangement by persons skilled in the art to achieve the positional, fatigue-reducing advantages of the present invention.

Figure 3:
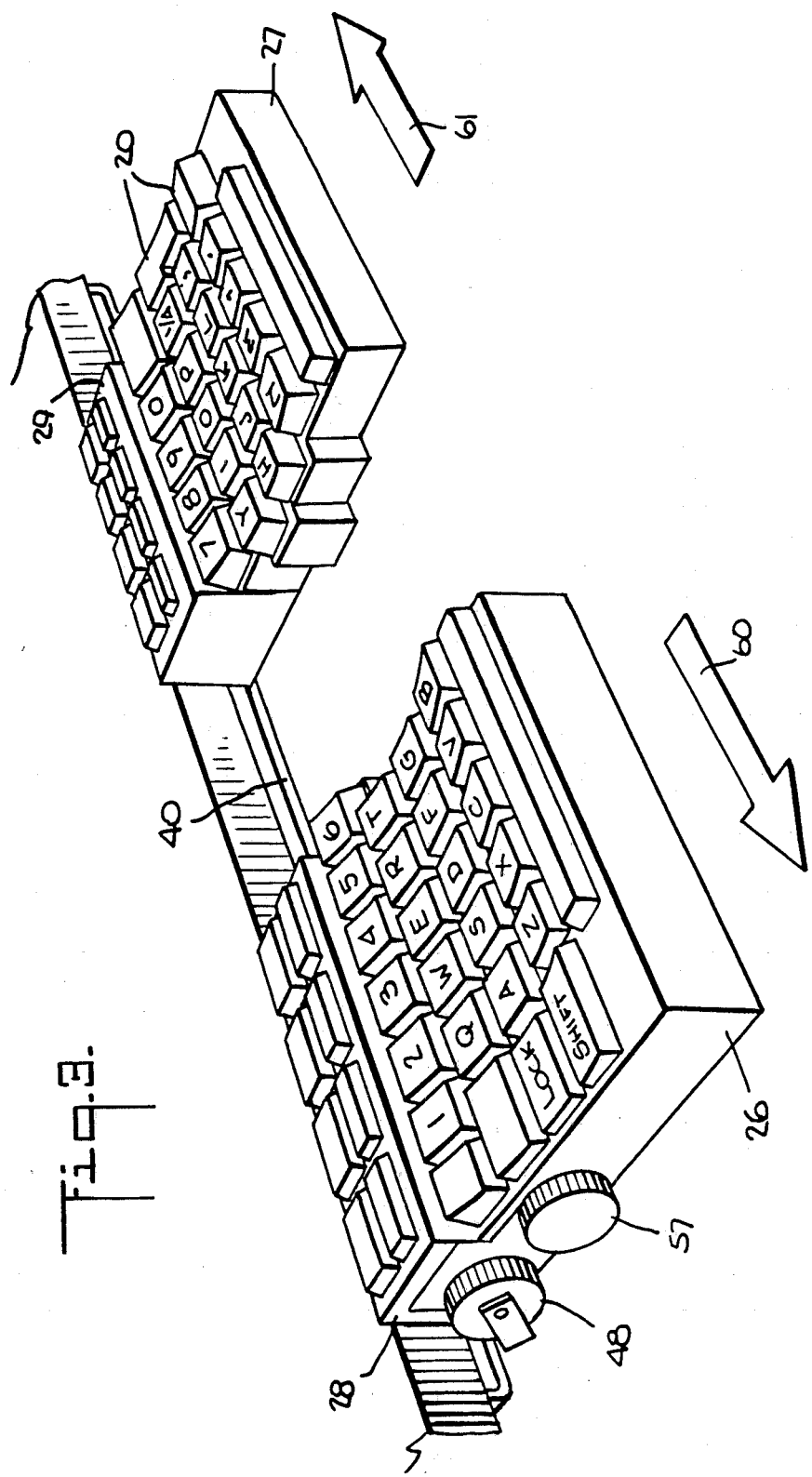
FIG. 3 is an isometric representation of the keyboard sections which have been separated horizontally with respect to one another.

FIG. 3 is an isometric representation showing keyboard portions 26 and 28 separated from keyboard portions 27 and 29. By operation of the horizontally slidable engagement between channel portion 42 of mounting bracket 41 and track 40 for the left half of keyboard 14, and a similar arrangement for the right half thereof, the keyboard halves are horizontally translatable in the directions of arrows 60 and 61. As shown, the separation of the keyboard halves produces a space therebetween which, as will be described hereinbelow, can accommodate other elements of the information processing machine.

FIG. 4 is an isometric representation of the embodiment described hereinabove wherein the keyboard halves have been separated sufficiently to permit display 12 to be disposed therebetween. As shown in phantom, in this embodiment, display 12 is arranged above supporting surface 15, and after the keyboard halves have been separated sufficiently, the display is lowered into the region therebetween. Any of several known methods and mechanisms (not shown), including manual placement, can be utilized to facilitate such a placement of display 12. As shown by arrows 65 and 66, keyboard portions 26 and 27 are shown to pivot vertically, in response to the loosening of pivot screw 57 for the left half of the keyboard, and a corresponding pivot screw (not shown) for the right half of the keyboard. As previously noted, such pivoting of keyboard portions 26 and 27 in the direction of the arrows will not affect the orientation of keyboard sections 28 and 29 which maintain a horizontal orientation.

Figure 4A:
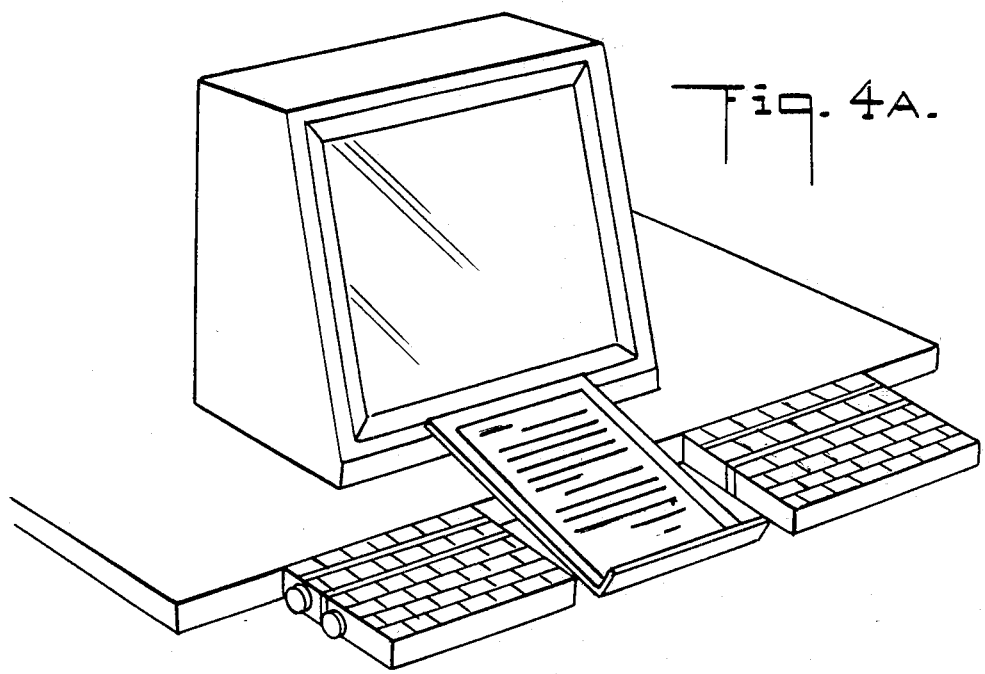
FIG. 4A shows an embodiment of the invention wherein the keyboard sections have been separated and a copy holder has been inserted between the two keyboard sections.
Figure 4B:
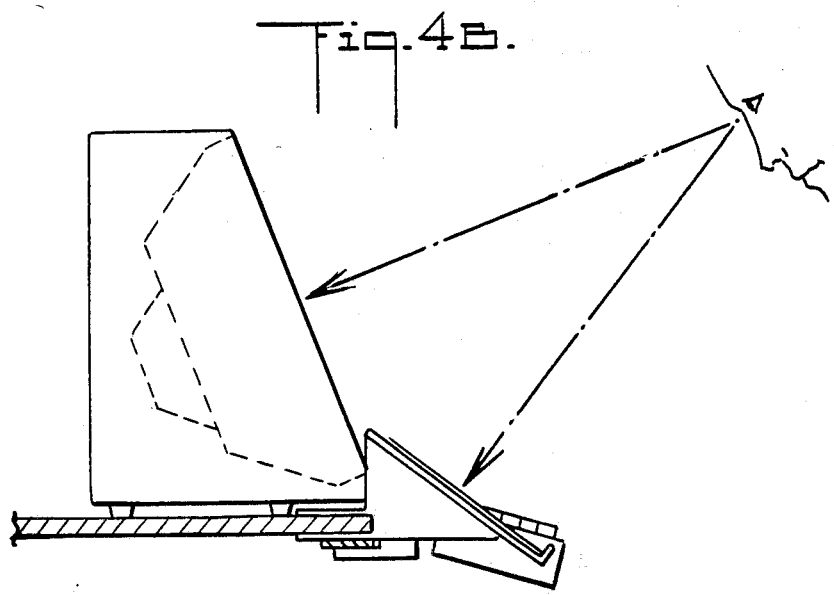
FIG. 4B shows a side view of the arrangement shown in FIG. 4A and shows that the copy holder can be arranged at a focal distance with respect to the human operator which is substantially equal to a focal distance between the human operator and the display.

FIG. 4A shows an arrangement of the keyboard sections wherein a copy holder is placed between the keyboard sections when they have been horizontally translated. As shown in FIG. 4B, a copy holder may be arranged at a focal distance with respect to the human operator which is substantially equal to a focal distance between the human operator and the display.

Figure 4C:
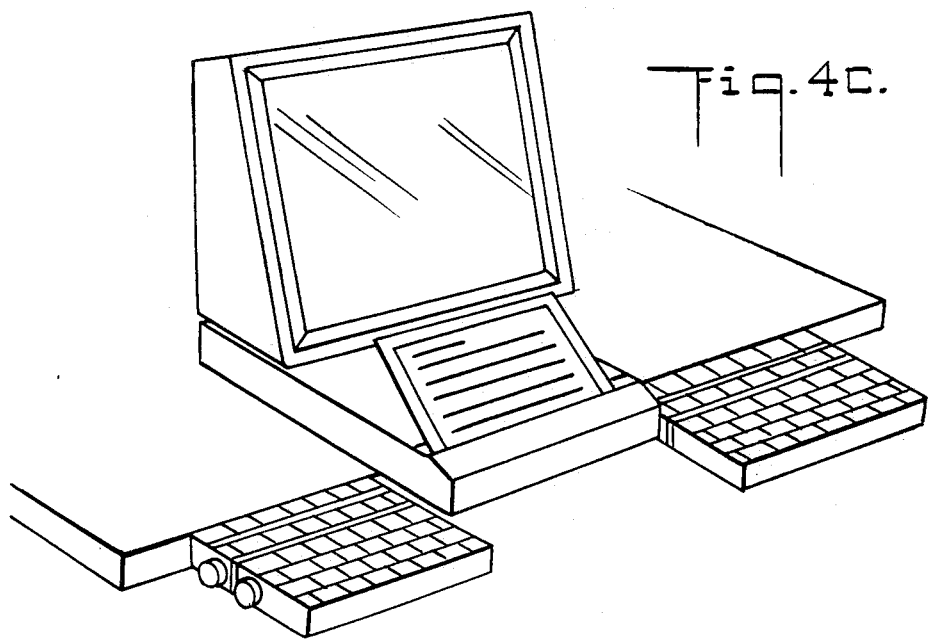
FIG. 4C shows an embodiment of the invention wherein a printer is arranged between the separated keyboard sections.
Figure 4D:
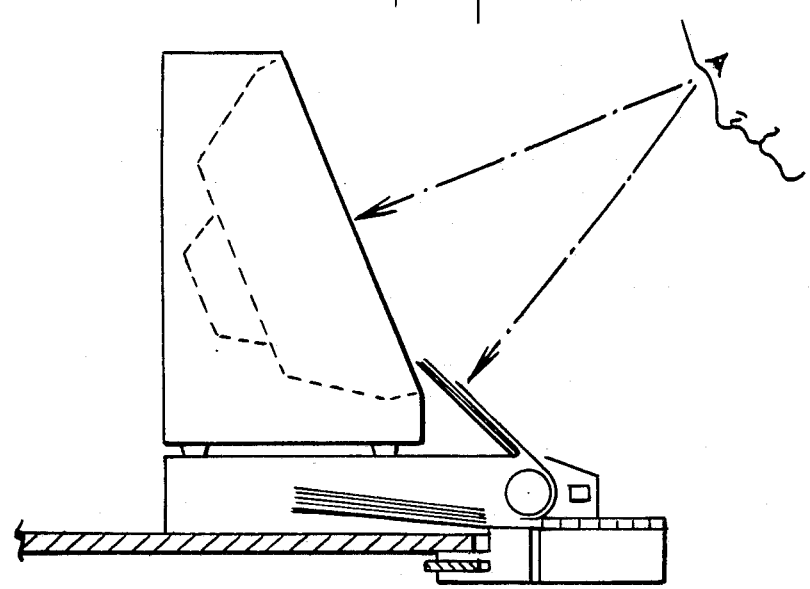
FIG. 4D is a side view of the arrangement shown in FIG. 4C showing how the printer is provided with a paper holder for presenting paper, after being printed, to the human operator whereby the human operator can view the paper from a selected comfortable posture and location during communication.

FIG. 4C shows that a printer for producing a permanent record of the communication between the human operator and the information processing machine may be disposed between the separated keyboard sections. The printer can conveniently be arranged so that it is stowable or collapsible beneath the display. As shown in FIG. 4D, the printer is provided with paper control means for supplying at least one configuration of paper to the printer for printing a communication thereon, means for removing the paper after being printed and for depositing the printed paper in a predetermined paper stacking location, the printer being disposed in a region substantially intermediate of the first and second keyboard sections. Preferably, the paper holder of the printer is disposed so that the paper holder and the display are arranged at substantially equal focal working distances from a predetermined region where the eyes of the operator would be located.

Figure 5A:
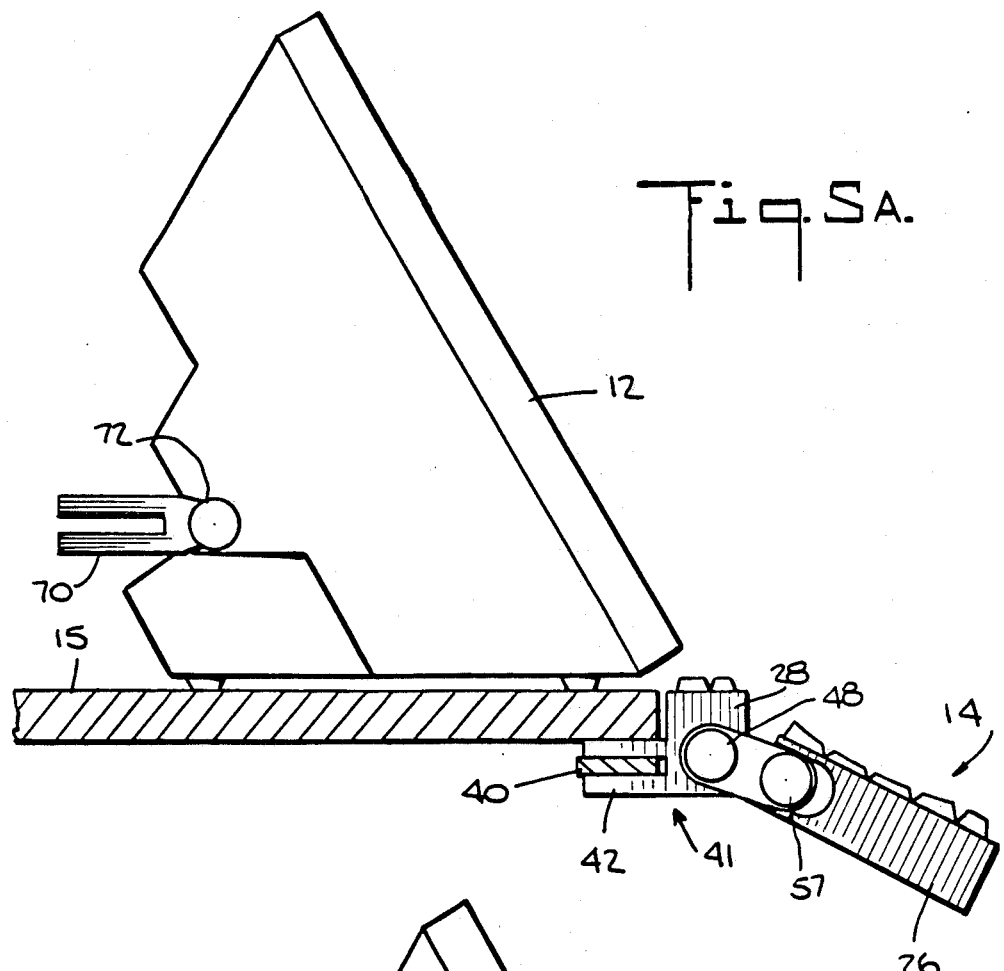
FIG. 5A is a side view of the embodiment of FIG. 1 illustrating an underedge mounting of the keyboard sections.
Figure 5B:
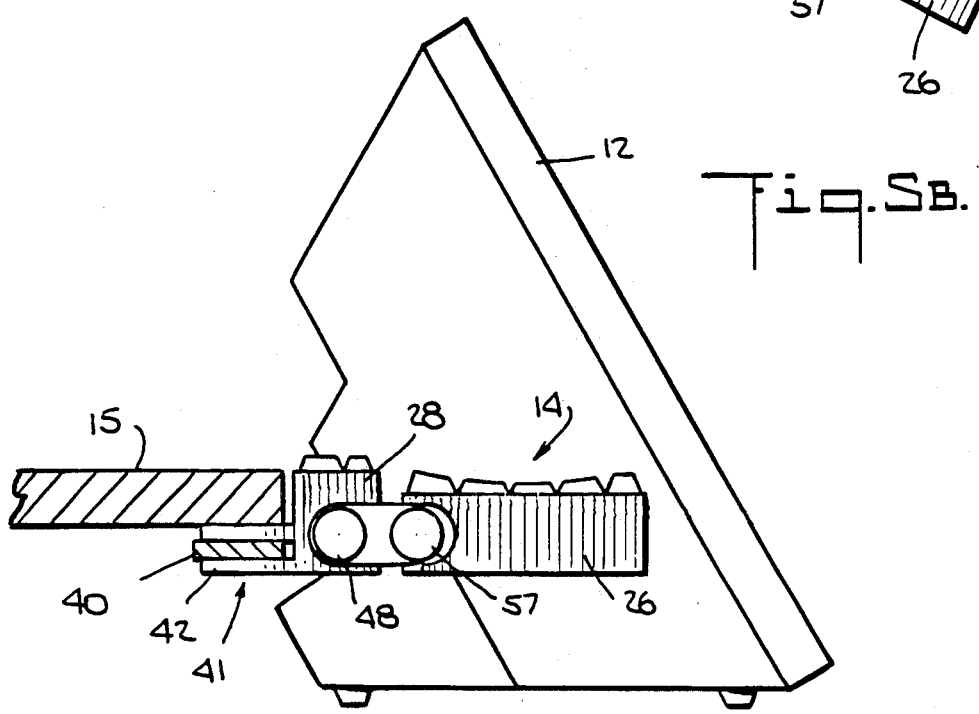
FIG. 5B shows a side view of the embodiment of FIGS. 1 and 5A with the display also mounted in an underedge manner.

FIGS. 5A and 5B are side plan views of display 12 and keyboard 14 discussed with respect to FIG. 1. As shown in FIG. 5A, channel portion 42 of mounting bracket 41 engages track 40 beneath supporting surface 15. Moreover, display 12 is provided with a mounting bracket 70 which is coupled to the display by an adjustment screw 72. FIG. 5B shows the display mounted below the edge of supporting surface 15.

Figure 6:
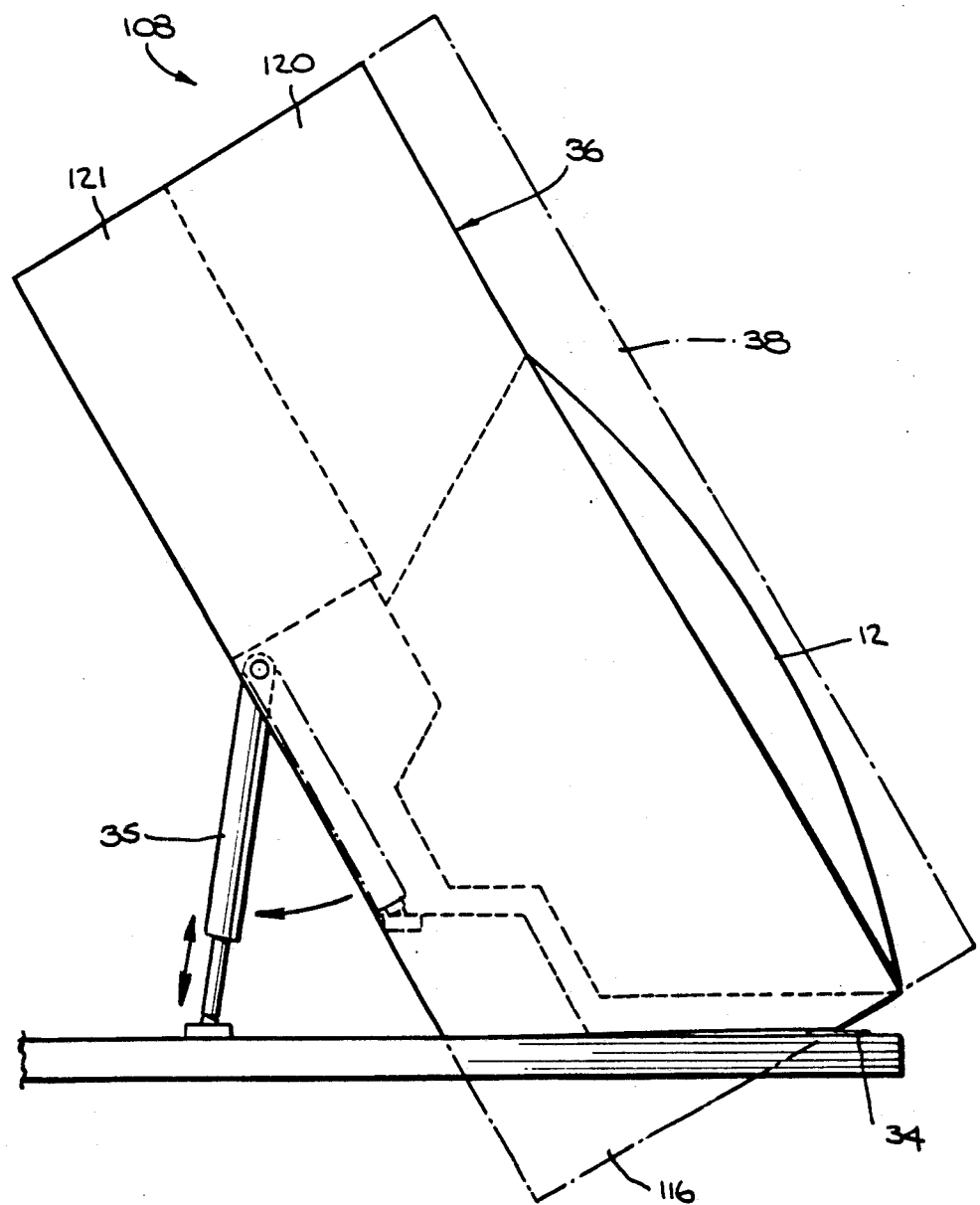
FIG. 6 is a simplified side view of the arrangement of FIG. 5 showing the display incorporated into a portable word processor arrangement.

FIG. 6 is a cutaway side view of an information processing machine, illustratively a word processor 108, in which display 12 can be placed. An anti-slip device 34 is placed atop support surface 15, illustratively a table top, so as to prevent unexpected forward motion of word processor housing 36. While the word processor unit may rest on the support surface at the angle formed by removal of a triangularly shaped rear corner lid 116, the unit should be adjusted until the surface at the center of display 12 is substantially orthogonal to the operator's view by adjusting the length of a rear support rod 35. Rear support rod can be swung into the main portion of word processor 108 when not in use, as shown. A space at upper rear of the word processor has been allocated to a disk drive 121, and to an electronics area 120 (not shown here). A front lid 38 may be arranged to protect display 12 during transport.

In FIG. 7A, word processor 108 is shown placed in the position on support surface 15 on which it will rest once rear corner lid 116 has been removed.

In FIG. 7B, a cutaway side view of the rear corner lid 116 is shown, with the two halves of keyboard 14 packaged therein. If the two halves of keyboard 14 were joined, the composite width would be nearly twice the width of the portable word processor 108, but since keyboard 14 is splittable, both halves, represented by left half auxiliary keyboard 28 and left half main keyboard 26 plus right half auxiliary keyboard 29 and right half main keyboard 27, may fit within rear corner lid 116, together with power cables or other miscellaneous word processor fittings or supplies.

FIG. 7C is a simplified isometric view of word processor 108 showing word processor housing 36 resting directly on a horizontal support surface (not shown). The two keyboard sections are shown in phantom joined to the word processor housing. This resting of word processor housing 36 at an angle with respect to its support surface is particularly appropriate in situations where the operator sits with the front portion of the word processor extending over the forward portion of the operator's lap, with the hands nearly at the sides. This is a particularly advantageous operating position in embodiments of the invention where display 12 is equipped with a touch-sensitive screen, since the operator's fingers could rapidly leave either keyboard half, depending on the operator's choice of pointing finger, by using only the elbow joint to cause the forearm to move in an arcuate motion from the keyboard half to the screen. This is a very advantageous arrangement of a splittable keyboard and touch-sensitive display, as it allows rapid editing touch access without long waiting periods before the fingers are again placed over the home row keys. This view of word processor housing 36 also shows a controls aperture 118 at the top center of the housing, which allows the mounting of all controls directly on the printed circuit boards that contain the main electronic logic, allowing significant customization opportunities.

FIG. 8A shows a rear-to-front isometric view of the home row keys on left keyboard portion 26. In addition to a customary set of main character markings 92 on a depressed keytop 124, a set of auxiliary character markings 94 on the rear and side flanges of key caps 123 is provided in this embodiment. In order to supplement standard home row key indicia, such as raised dots on depressed keytop area 124 or a serrated edge atop key cap 123 at a key top edge 129, a pair of conductive edge strips 137a, b are placed atop the key, surrounding main character marking 92. A low voltage alternating current is placed between the two halves of conductive edge strips 137a and 137b, illustratively 10 volts, 60 Hertz, nominally of square wave shape. The use of this voltage will be discussed further in connection with FIG. 8B. The current that can flow is limited to only a few microamperes, so there is no health danger of any kind to the operator.

The passage of this minute current through the fingertips gives rise to a feeling of slight roughness, as if there were a series of ridges on keytop 124 instead of a flat, conductive surface thereon. Conductive edge stripes 137 have another use in that the presence of the operator's finger can be detected, either by drawing a very small current from the signal source, or by conveying a minute portion of the alternating field that is indigenous to most equipment sites from adjacent power lines. The conductive edge stripes 137 are connected through a set of conductive flange stripes and flexible connectors 131 to a set of jacks 132 which, in turn, connect to the electronic circuit by use of a set of plugs 133.

FIG. 8B shows a simplified block diagram of the position feedback and position sensing logic. As mentioned hereinbefore, a generator module 143 produces a low voltage alternating current, illustratively 10 volts, 60 Hz., illustratively in the form of a square wave. This generator module has a limited current production capacity, illustratively 5 microamperes. This current is fed to the keytop through a pair of sense modules 136. As stated previously, the presence of a mild alternating current on the conductive key top edge strips 137 of FIG. 8A produces a feeling to the operator that the fingertip is atop a surface comprised of a series of ridges. It may be worthwhile to note that the same feeling of a roughened surface occurs when a patron brushes a fingertip across an ungrounded metal display case, in this case because a very small current is flowing from the metal surface to the human body. The pair of sense modules 136 will sense either a slight current flow to the key top from the generator module if the operator's fingertips are in grazing contact with the conductive edge stripes 137, or can capacitively pickup stray alternating current fields from surrounding power lines if the operator's fingers are a very short distance away, for example, 0.003 inches from the key top. If such a current is detected by sense modules 136, an output signal is provided to logic module 140 which produces a processable information signal at a touch sense output point 138. The sense modules are equipped with a protector system, such as the thyristor that markedly reduces sensitivity to unexpectedly high voltage inputs, such as those that occur when an operator walks across to build up a static charge and then touches the keyboard. All four homerow key caps 123 are provided with a version of the circuit illustrated. On the left keyboard section, the keys are corresponding to the letter "G" is provided with a set of conductive stripe edges 137, but is connected to the logic circuit of FIG. 9C, which will be discussed below, so as to be sensitive to stray alternating current fields only. Thus, no home row indication is given. Thus, if the left forefinger is not placed on the rightmost home row character "F" as is learned in Sholes/Christopher QWERTY keyboard training, but rather placed one keytop to the right, on "G", the logic circuit output can instruct the system that any keytops depressed by the left fingers are likely to be in error, and can give an error signal to the operator, and can optionally be used to correct the mistakenly-depressed key tops into the most probable characters for that finger excursion from the correct home row character positions. The electronic sensing circuit above can be replaced by those skilled in the art by any of several other known systems, in light of this teaching, such as photoelectric reflective sensor pairs, infra-red heat sensors, air jet flow sensors or other suitable indicators of the fingertips being placed on or just above keys in the home row area.

An alternative home row or fingertip position sensing system is shown in FIG. 9A, wherein a row of main fibers 126 is attached to key cap flange 125 by conductive adherence strip 135 so that the upper end projects 0.007–0.010 inches above keytop edge 129. Such fibers may be of conductively-treated plastic as polypropylene, nylon or other fibers used in rug manufacture, for example, as vended by Schlegel Manufacturing Company, Jefferson Road, Henrietta, N.Y. The top of the main fibers is raised above the key top edge so that the operator may feel a slight brush when the fingertip passes over the outside edge of the home row key. The flexibility of the fiber is such that there is no interference with keytop depression, or passing from the home row key to an adjacent key.

If desired, a more sensitive indicia version may be provided in which much thinner fibers are employed. These thinner fibers constitute a set of guard fibers 127, which have substantially more flexibility than main fibers 126. The guard fibers would be too delicate for this application if used alone, but in combination with the surrounding support given by main fibers will function well. Conductive fibers of both the thicker main fibers 126 and guard fibers 127 are available because it is often desired to make rug fibers conductive to drain away static electricity, as in low humidity libraries, or locations sensitive to static electricity, such as around computer equipment. Only a very low conductivity is needed to conduct stray alternating current fields from either main fibers 126 or guard fibers 127, and subsequently to a logic current, as was described above with respect to FIG. 8B.

FIG. 9B shows a similar fiber sensor system, but here, the substantially straight fibers 126 of FIG. 9A are replaced by a pre-bent fiber 128, affixed to the depressed keytop area and the key cap flange by conductive adherence strips 135. The pre-bent curve of bent fiber 128 is such that it presents the bent portion of the fiber approximately 0.005 to 0.008 inches above the depressed keytop. As in FIG. 9B, a slight touch of pre-bent fibers 128 by the operator's fingertip is sufficient to couple enough of the stray alternating current field to the logic circuit.

In FIG. 9C, a simplified block diagram of the logic circuit is shown. A sense module 136 may be of the protected field-effect gate type, or other logic unit having a high impedance input. Sense module 136 is also protected against static electricity pulses which may be conducted by the operator into the circuit if he or she has been walking on a high pile carpet in times of low humidity before beginning to operate the keyboard. While such thin fiber feedback and position sensing systems may superficially appear to be too delicate for a physically demanding application such as a keyboard, the inherent crush resistance of modern plastic rug fibers and the low flange mounting combine to provide a long service life, and a positive, but not obtrusive, means of giving the operator feedback as to whether the fingers are correctly placed on the home row keys before typing is started, or if typing resumes after a task that causes one or both hands to leave the keyboard area, such as answering a nearby telephone.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and description in this disclosure are proffered to facilitate comprehension of the invention and should not be construed to limit the scope thereof.

What is claimed is:

1. An arrangement reducing stresses and tensions experienced by a human operator during communication between the human operator and an information processing machine, the arrangement being of the type wherein the human operator enters information to the information processing machine by manipulation of a plurality of actuators disposed on a keyboard in a predetermined continuous arrangement corresponding to at least one row of adjacent actuators, and receives processed information by viewing a display responsively controlled by the information processing machine, the arrangement further comprising:

first and second separable keyboard sections holding respective ones of the plurality of actuators in respective keyboard section arrangements, said respective keyboard section arrangements corresponding to predetermined portions of the predetermined arrangement of the plurality of actuators whereby said respective keyboard section arrangements, when disposed adjacent to one another, form said predetermined continuous arrangement of actuators; and adjustable support means for holding said first and second keyboard sections in respective orientations and locations selectable by the human operator, said first and second keyboard sections being adjacently arrangeable in a first arrangement having a longitudinal direction so that said keyboard sections form a continuous uninterrupted conventional keyboard arrangement when so arranged together such that the spacing between adjacent actuators on different keyboard sections is substantially the same as the spacing between actuators on the same keyboard sections, said keyboard sections being displaceable so that the operator can move the keyboard sections to any of said selectable orientations and locations, thereby allowing the operator to select an optimum location and orientation, said adjustable support means comprising means for allowing said first and second keyboard sections to be displaceable at least in part in the longitudinal direction in a first plane in which the first and second keyboard sections are disposed when arranged adjacent one another, to a position in a second plane disposed at an angle from said first plane measured with respect to said longitudinal direction of said keyboard sections, and to a position in a third plane disposed at an angle from said first plane measured with respect to a direction perpendicular to said longitudinal direction in said first plane, whereby the operator over time can gradually adjust said first and second keyboard sections from said first arrangement toward said optimum location and orientation thereby gradually to become accustomed to said optimum location and orientation.

2. The arrangement of claim 1 wherein there is further provided display support means for holding the display in a predetermined orientation at a first location substantially intermediate of said respective positions of said first and second keyboard sections when said first and second keyboard sections are separated from one another.

3. The arrangement of claim 2 wherein there is further provided copyholder means arranged at a focal distance with respect to the human operator which is substantially equal to a focal distance between the human operator and the display.

4. The arrangement of claim 1 wherein at least a portion of the predetermined continuous arrangement of actuators on the keyboard corresponds to an arrangement of keys of a conventional typewriter keyboard.

5. The arrangement of claim 4 wherein said conventional typewriter keyboard corresponds at least in part to a QWERTY typewriter keyboard.

6. The arrangement of claim 1 wherein there is further provided a third keyboard section holding at least one of the plurality of actuators at a second location essentially intermediate of said respective positions of said first and second keyboard sections.

7. The arrangement of claim 6 wherein one of the plurality of actuators at said second location is assigned a display control function.

8. The arrangement of claim 1 wherein said adjustable support means comprises first and second adjustable support means comprising:

support means having a longitudinal axis extending along said longitudinal direction;

a movable member arranged for movement along said longitudinal direction engaging with said support means;

coupling means having released and locked states for coupling said movable member to said support means at a selectable location along said longitudinal direction;

rotatable support means for rotating a respective one of said first and second keyboard sections to a position in said second plane; and vertical rotation coupling and support means for communicating with said rotatable support means and permitting said respectively associated keyboard section to rotate to a position in said third plane.

9. The arrangement of claim 8 wherein there are further provided graduated markings identifying predetermined positional orientations of said respectively associated keyboard section with respect to a reference positional orientation.

10. The arrangement of claim 8 wherein there is further provided resilient means for resiliently resisting rotation of said keyboard section when said coupling means is in said released state.

11. The arrangement of claim 10 wherein said resilient means comprises a spring.

12. The arrangement of claim 1 wherein there is further provided printer means for producing a permanent record of the communication between the human operator and the information processing machine.

13. The arrangement of claim 12 wherein said printer means is provided with paper control means for supplying at least one configuration of paper to said printer means for printing the communication thereon, removing said paper after being printed, and depositing said printed paper in a predetermined paper stacking location, said printer means being disposed in a region substantially intermediate of said first and second keyboard sections.

14. The arrangement of claim 13 wherein said printer means is provided with a paper holder means for presenting said paper, after being printed, to the human operator whereby the human operator can view said paper from a selected comfortable posture and location during the communication.

15. The arrangement of claim 14 wherein said paper holder and the display are arranged at substantially equal focal working distances from a predetermined region where the eyes of the operator would be located.

16. The arrangement of claim 15 wherein there is further provided copyholder means for holding a copy of information which is desired to be entered into the information processing machine by the operator, said copyholder means being disposed at a focal distance from said predetermined region which is substantially equal to said working distance of the display.

17. The arrangement of claim 16 wherein said copyholder means is disposed in said region substantially intermediate of said first and second keyboard sections.

18. A communication system allowing the exchange of information between a human operator and a responsive information processing machine, the communication system comprising:

input keyboard means having first and second keyboard sections each having a plurality of actuators arranged thereon, said input keyboard means being positionally adjustable in space by the human operator to achieve an orientation which requires minimum muscular pretension on the part of the human operator while actuating said input actuators, said first and second keyboard sections being removably adjacently arrangeable together in a first arrangement so as to form a conventional keyboard arrangement when arranged adjacently together such that the spacing between adjacent actuators on different keyboard sections is substantially the same as the spacing between actuators on the same keyboard section, said keyboard sections being displaceable so that when displaced, said keyboard sections form a split keyboard, said first and second keyboard sections being adjustable in a plurality of positions selectable by the operator, said positions defined by lateral movement of said keyboard sections at least in part relatively toward and away from each other in a first plane, rotation about a line along the direction of such lateral movement and rotation about a line in the first plane perpendicular to such lateral movement, whereby the operator can select an optimum operating position and can adjust said first and second keyboard sections over time gradually toward said optimum position thereby gradually to become accustomed to said optimum position, the keyboard sections being rearrangeable in said first arrangement comprising a conventional keyboard arrangement when the operator so desires; and output display means for providing responsive information to the human operator, said output display means being positionable intermediate of said first and second keyboard sections when said keyboard sections are displaced from one another.

19. The communication system of claim 18 wherein said input keyboard means is provided with a plurality of actuators arranged substantially in a QWERTY format, said first and second keyboard sections having respective ones of said plurality of actuators in respective portions of said QWERTY format, each of said portions being associated with a respective one of the right and left hands of the human operator.

20. The communication system of claim 18 wherein there is further provided copyholder means for holding a copy of input information in a region essentially intermediate of said first and second keyboard sections.

21. The communication system of claim 20 wherein said output display means and said copy of information are arranged to be essentially equidistant from a predetermined region in space where the eyes of the operator would be located.

22. The communication system of claim 18 wherein there is further provided armrest means for the human operator, said armrest means being provided for supporting at least a portion of the forearms of the human operator, said first and second keyboard sections each being disposed in the vicinity of said armrest means.

23. The communication system of claim 18 wherein there is further provided a control function keyboard having at least one actuator thereon and arranged substantially intermediate of the first and second keyboard sections.

24. A keyboard arrangement having a plurality of actuatable keys, each key being associated with a respective predeterminable symbol, the actuatable keys being distributed over the keyboard arrangement in accordance with a predetermined distribution having preselected numbers of rows and columns of the actuatable keys, the keyboard arrangement further comprising first and second keyboard sections, each keyboard section holding respective ones of the actuatable keys arranged in respective portions of the predetermined distribution, said first and second keyboard sections being arrangeable adjacent each other whereby when said first and second keyboard sections are arranged adjacent to one another, the predetermined distribution of the actuatable keys formed of said respective portions forms a continuous sequence of the rows and columns, the spacing between the rows and columns being substantially the same throughout said continuous sequence, said keyboard sections being removably displaceable so that when said keyboard sections are displaced from one another, said keyboard sections form a split keyboard, said keyboard arrangement including mounting means for adjustably securing said keyboard sections in a plurality of orientations and locations determined by operator preference, whereby an operator can adjust said first and second keyboard sections over time gradually toward an optimum one of said plurality of orientations and locations thereby gradually to become accustomed to said optimum one of said plurality of orientations and locations, said plurality of orientations and locations defined by lateral movement of said keyboard sections at least in part relatively toward and away from each other in a first plane, rotation about a line along the direction of such lateral movement and rotation about a line in the first plane perpendicular to such lateral movement.

25. The keyboard arrangement of claim 24 wheein there is further provided a third keyboard section arranged to be detachably couplable to said first and second keyboard sections holding further ones of the actuatable keys associated with selectable keyboard functions.

26. The keyboard arrangement of claim 24 wherein the rows and columns of actuatable keys are arranged to form acute and obtuse angles with respect to each other, a plurality of the rows and at least one of the columns each having actuatable keys therein which are on different ones of said first and second keyboard sections.

27. The keyboard arrangement of claim 24 wherein the predetermined distribution of the actuatable keys is of a type wherein the actuatable keys in said respective portions of the predetermined distribution are actuated by respective hands of a human operator of the keyboard arrangement.

28. The keyboard arrangement of claim 27 wherein the actuatable keys are each associated with a respective letter of an alphabet.

29. The keyboard arrangement of claim 28 wherein the predetermined distribution of the actuatable keys is in accordance with a QWERTY keyboard assignment scheme.

30. The keyboard arrangement of claim 28 wherein the predetermined distribution of the actuatable keys is in accordance with a Dvorak keyboard assignment scheme.

31. A keyboard arrangement of an information processing machine, the keyboard arrangement comprising:

first and second keyboard portions each having a plurality of keys thereon in a predetermined configuration, each such key corresponding to an associated one of the letters of the alphabet, numbers, elements of punctuation, and keyboard functions, said predetermined configuration of keys being arranged such that ones of the keys which are conventionally operated with the left-hand of an operator are arranged on said first keyboard portion and ones of said keys which are conventionally operated with the right hand of said operator are arranged on said second keyboard portion, said first and second keyboard portions being arrangeable adjacent to one another to produce a continuous arrangement of said plurality of keys, said first and second keyboard portions being removably displaceable with respect to each other, said keyboard portions forming a continuous conventional keyboard arrangement when arranged adjacently together such that the spacing between adjacent actuators on different keyboard portions is substantially the same as the spacing between actuators on the same keyboard portions, and forming a split keyboard when displaced from one another, said keyboard portions being arrangeable in a plurality of orientations and locations when displaced from one another depending on operator preference and being adjustable over time gradually by an operator toward an optimum orientation and location, thereby gradually to allow an operator to become accustomed to said optimum one of said plurality of orientations and locations, said keyboard arrangement including adjustable mounting means for supporting and holding said keyboard portions in said optimum orientation and location, said plurality of orientations and locations defined by lateral movement of said keyboard sections at least in part relatively toward and away from each other in a first plane, rotation about a line along the direction of such lateral movement and rotation about a line in the first plane perpendicular to such lateral movement; and third keyboard means having a plurality of keys thereon, said plurality of keys on said third keyboard means corresponding to an associated one of a keyboard function, computer control function, and a function which is determined by said operator.

32. The keyboard arrangement of claim 31 wherein there is further provided means for adjustably coupling at least one of said first and second keyboard portions to said third keyboard means, whereby said one of said first and second keyboard portions is angularly vertically displaceable with respect to said third keyboard means.

33. The keyboard arrangement of claim 32 wherein there is further provided means for horizontally slidably coupling said third keyboard means and for fixing a selectable horizontal distance between said first and second keyboard portions.

34. The keyboard arrangement of claim 33 wherein there is further provided fourth keyboard means having a plurality of keys thereon corresponding to an associated one of a keyboard function, a computer control function, and a function which is determined by said operator.

35. The keyboard arrangement of claim 32 wherein the keys on the first and second keyboard portions are each provided with an associated key cap having a marking on the top thereof indicative of said associated one of the letters of the alphabet, numbers, elements of punctuation, and keyboard functions.

36. The keyboard arrangement of claim 35 wherein at least one of said key caps associated with the keys on the first and second portions is provided with a surface arranged at an angle with respect to the top thereof, said surface being provided with a further marking indicative of said associated one of the letters of the alphabet, numbers, elements of punctuation, and keyboard functions.

37. The keyboard arrangement of claim 35 wherein selected ones of said key caps are provided with tactile sensor means for providing a feedback sensation to an operator.

38. The keyboard arrangement of claim 37 wherein said tactile sensor means comprises:

first and second electrical contact means arranged on said top of said key cap for communicating with said operator; and signal supply means for producing a voltage across said first and second electrical contact means.

39. The keyboard arrangement of claim 37 wherein said tactile sensor means comprises fiber means arranged on said key cap to communicate with said operator.

40. The keyboard arrangement of claim 39 wherein said fiber means is formed of a conductive polymeric material.

41. An information processing arrangement of the type having a display means for displaying the information being processed, the display means having a generally planar viewing surface, the information processing arrangement further comprising:

a housing for containing the display means, said housing having a lower-most surface arranged at an angle with respect to the generally planar viewing surface of the display means, said angle being less than 90°;

storage compartment means removably coupled to said lower-most surface of said housing, said storage compartment means having a respective bottom-most surface forming an angle with respect to the generally planar viewing surface of the display means which is greater than said angle formed between the generally planar viewing surface and said lower-most surface of said housing, said storage compartment means comprising a substantially triangular shaped member, said housing and triangular shaped member, when coupled together, forming a substantially rectangular housing member; and keyboard means having a plurality of actuators thereon arranged in a predetermined sequence for facilitating communication between an operator and the information processing arrangement, said keyboard means being removably coupled to said information processing arrangement, said keyboard means being separable into two sections, said two sections being disposable in said storage compartment means when said storage compartment means is attached to said housing.

42. The information processing arrangement of claim 41 wherein said first and second keyboard sections are arrangeable adjacent to one another so as to form said predetermined sequence of actuators in an uninterrupted manner.

43. The information processing arrangement of claim 41 wherein there are further provided first and second mounting means installed on said housing on either side of the display means for mounting said first and second keyboard sections.

44. The information processing arrangement of claim 43 wherein said first and second mounting means are each provided with means for adjustably positioning said first and second keyboard sections, respectively.

* * * * *